United States Patent
Hunter et al.

(10) Patent No.: US 11,900,033 B2
(45) Date of Patent: Feb. 13, 2024

(54) METHODS AND SYSTEMS FOR PRINTED CIRCUIT BOARD COMPONENT PLACEMENT AND APPROVAL

(71) Applicant: BOARDERA SOFTWARE INC., Kitchener (CA)

(72) Inventors: Curtis Hunter, Kitchener (CA); David Workman, Kitchener (CA)

(73) Assignee: BOARDERA SOFTWARE INC., Kitchener (CA)

( * ) Notice: Subject to any disclaimer, the term of this patent is extended or adjusted under 35 U.S.C. 154(b) by 57 days.

(21) Appl. No.: 17/485,634

(22) Filed: Sep. 27, 2021

(65) Prior Publication Data

US 2023/0102019 A1 Mar. 30, 2023

(51) Int. Cl.
| | |
|---|---|
| *G06F 30/30* | (2020.01) |
| *H05K 3/00* | (2006.01) |
| *G06F 30/31* | (2020.01) |
| *G06F 30/392* | (2020.01) |
| *H05K 13/00* | (2006.01) |
| *G06F 115/12* | (2020.01) |

(52) U.S. Cl.
CPC ............ *G06F 30/31* (2020.01); *G06F 30/392* (2020.01); *H05K 3/0005* (2013.01); *G06F 2115/12* (2020.01); *H05K 13/0015* (2013.01)

(58) Field of Classification Search
None
See application file for complete search history.

(56) References Cited

U.S. PATENT DOCUMENTS

| | | | | |
|---|---|---|---|---|
| 7,627,838 | B2 * | 12/2009 | Keswick | G06F 30/39 716/132 |
| 9,268,895 | B2 * | 2/2016 | Perry | G06F 30/398 |
| 10,089,429 | B2 * | 10/2018 | Hirschman | H05K 3/0005 |
| 10,255,401 | B2 * | 4/2019 | Meng | G06F 21/32 |
| 10,592,704 | B2 * | 3/2020 | Brookshire | G06F 30/398 |
| 10,860,776 | B1 * | 12/2020 | To | G06F 30/392 |
| 11,449,654 | B1 * | 9/2022 | Warren | G06F 30/31 |
| 2015/0135157 | A1 * | 5/2015 | Lin | G06F 30/39 716/137 |
| 2022/0012405 | A1 * | 1/2022 | Oron | G06F 30/3953 |

* cited by examiner

*Primary Examiner* — Leigh M Garbowski
(74) *Attorney, Agent, or Firm* — Dickinson Wright LLP; Matthew D. Powell

(57) ABSTRACT

An aspect of the disclosed embodiments is a method for printed circuit board (PCB) component placement comprising: graphically displaying, on a display device, PCB design features of a PCB design; and providing a user interface control for designating one or more of the PCB design features as electrical contacts for a first selected electrical component. Other aspects are disclosed.

23 Claims, 21 Drawing Sheets

METHODS AND SYSTEMS FOR PRINTED CIRCUIT BOARD COMPONENT PLACEMENT AND APPROVAL

TECHNICAL FIELD

The following relates generally to printed circuit board design and manufacturing, and more particularly to methods and systems for printed circuit board component placement and approval.

BACKGROUND

A printed circuit board (PCB) is a device designed to both physically support and electrically interconnect electronic components of a circuit or circuits of an electronic device. A PCB may include one or more layers of electrically conductive traces laminated atop respective surfaces of a non-conducting supportive substrate, and extending between electrically conductive component pads and/or electrically conductive vias formed through the substrate for electrically interconnecting multiple layers of the PCB. A PCB may include additional layers, such as layer(s) of other material(s) patterned to apply words/symbols onto the PCB substrate and/or to provide patterned protective coatings. Electrical and electronic components may be electrically and physically connected through openings in such patterned protective coatings to respective conductive pads and/or vias of a PCB using an electrically conductive material such as solder. The assembly including PCB and connected components is generally known as a PCB assembly (PCBA).

A PCB design may be created by an engineer or other user of a computer aided design (CAD) software application. Such a CAD software application may be configured to enable creation of the PCB design using a computer user interface (UI). Using CAD software a user may specify physical features at each layer, a bill of materials (BOM) specifying the components by part number and/or type and/or specification, and XYRS data specifying the X and Y position, rotation (R) and side (S) of the components that are to be electrically and physically connected to the PCB to form the PCBA.

It is common for the placement of electronic components on a PCB to be specified in the form of a table of X and Y coordinates along with rotation (R) and side (S) information. However, as any standards for establishing zero degrees of rotation of a component with respect to the PCB location tend not to be widely adhered to, it is common for components to be rotated incorrectly in the course of placement. Furthermore, X and Y coordinates are global for an entire panel of PCBs that are to be manufactured and, as such, these do not generally account for skew or manufacturing tolerances in the PCBs. As a result, components placed and/or oriented at associated specified coordinates and with associated specified rotation, without regard to the actual locations of electrical contact features in the PCB design, can be placed incorrectly.

SUMMARY

An aspect of the disclosed embodiments is a method for printed circuit board (PCB) component placement including graphically displaying, on a display device, PCB design features of a PCB design. The method further includes providing a user interface control for designating one or more of the PCB design features as electrical contacts for a first selected electrical component.

An aspect of the disclosed embodiments is a system for printed circuit board (PCB) component placement including a user interface provided on a display device for graphically displaying PCB design features of a PCB design. The system further includes a user interface control for designating one or more of the PCB design features as electrical contacts for a first selected electrical component.

An aspect of the disclosed embodiments is a non-transitory computer readable medium embodying a computer program executable on at least one processor for printed circuit board (PCB) component placement, the computer program including computer program code for graphically displaying, on a display device, PCB design features of a PCB design. The computer program further includes computer program code for providing a user interface control for designating one or more of the PCB design features as electrical contacts for a first selected electrical component.

An aspect of the disclosed embodiments is a method for printed circuit board (PCB) component placement including receiving one or more electronic PCB design files defining a PCB design. The method further includes processing the one or more electronic PCB design files to determine which PCB design features of the PCB design are electrical contact features. The method further includes graphically displaying, on a display device, at least a portion of the PCB design including a plurality of the determined electrical contact features. The method further includes providing a user interface control for designating at least one displayed electrical contact feature as an electrical contact for a selected electrical component.

An aspect of the disclosed embodiments is a system for printed circuit board (PCB) component placement including a user interface provided on a display device for receiving one or more electronic PCB design files defining a PCB design. The system further includes a contact process for processing the one or more electronic PCB design files to determine which PCB design features of the PCB design are electrical contact features. The system further includes a user interface provided on the display device for graphically displaying at least a portion of the PCB design including a plurality of the determined electrical contact features. The system further includes a user interface control for designating at least one displayed electrical contact feature as an electrical contact for a selected electrical component.

An aspect of the disclosed embodiments is a non-transitory computer readable medium embodying a computer program executable on at least one processor for printed circuit board (PCB) component placement, the computer program including computer program code for receiving one or more electronic PCB design files defining a PCB design. The computer program further includes computer program code for processing the one or more electronic PCB design files to determine which PCB design features of the PCB design are electrical contact features. The computer program further includes computer program code for graphically displaying, on a display device, at least a portion of the PCB design including a plurality of the determined electrical contact features. The computer program further includes computer program code for providing a user interface control for designating at least one displayed electrical contact feature as an electrical contact for a selected electrical component.

As aspect of the disclosed embodiments is a method for printed circuit board (PCB) component placement. The method includes receiving one or more electronic PCB design files defining a PCB design. The method further includes processing the one or more electronic PCB design files to determine which PCB design features of the PCB design are electrical contact features. The method further includes processing electrical contact features to determine a subset of the electrical contact features that could together register with a footprint of a first electrical component. The method further includes determining an X-Y position and an orientation for the footprint that would cause the footprint to register with the subset of the electrical contact features. The method further includes generating XYRS data for the first electrical component based on the determined X-Y position and orientation of the footprint.

An aspect of the disclosed embodiments is a system for printed circuit board (PCB) component placement. The system includes a user interface provided on a display device for receiving one or more electronic PCB design files defining a PCB design. The system further includes a contact process for processing the one or more electronic PCB design files to determine which PCB design features of the PCB design are electrical contact features. The system further includes a cluster processor for processing electrical contact features to determine a subset of the electrical contact features that could together register with a footprint of a first electrical component. The system further includes a location processor for determining an X-Y position and an orientation for the footprint that would cause the footprint to register with the subset of the electrical contact features; and generating XYRS data for the first electrical component based on the determined X-Y position and orientation of the footprint.

An aspect of the disclosed embodiments is a non-transitory computer readable medium embodying a computer program executable on at least one processor for printed circuit board (PCB) component placement. The computer program includes computer program code for receiving one or more electronic PCB design files defining a PCB design. The computer program further includes computer program code for processing the one or more electronic PCB design files to determine which PCB design features of the PCB design are electrical contact features. The computer program further includes computer program code for processing electrical contact features to determine a subset of the electrical contact features that could together register with a footprint of a first electrical component. The computer program further includes computer program code for determining an X-Y position and an orientation for the footprint that would cause the footprint to register with the subset of the electrical contact features. The computer program further includes computer program code for generating XYRS data for the first electrical component based on the determined X-Y position and orientation of the footprint.

An aspect of the disclosed embodiments is a method for printed circuit board (PCB) component placement including receiving one or more electronic PCB design files defining a PCB design. The method further includes processing the one or more electronic PCB design files to determine which PCB design features of the PCB design are electrical contact features. The method further includes for each electrical component of a plurality of electrical components to be assembled with the PCB design: determining whether a footprint of the electrical component positioned and oriented in accordance with first XYRS data for the electrical component would register with electrical contact features of the PCB design; in the event that the footprint of the electrical component positioned and oriented in accordance with first XYRS data for the electrical component would not register with electrical contact features of the PCB design: conducting a corrective procedure to determine an X-Y position and orientation of the footprint that would register with a set of electrical contact features of the PCB design. The method further includes generating second XYRS data for the electrical component based at least on the determined X-Y position and orientation of the footprint.

An aspect of the disclosed embodiments is system for printed circuit board (PCB) component placement including a user interface provided on a display device for receiving one or more electronic PCB design files defining a PCB design. The system further includes a contact process for processing the one or more electronic PCB design files to determine which PCB design features of the PCB design are electrical contact features. The system further includes a registration process that, for each electrical component of a plurality of electrical components to be assembled with the PCB design: determines whether a footprint of the electrical component positioned and oriented in accordance with first XYRS data for the electrical component would register with electrical contact features of the PCB design; in the event that the footprint of the electrical component positioned and oriented in accordance with first XYRS data for the electrical component would not register with electrical contact features of the PCB design: conducts a corrective procedure to determine an X-Y position and orientation of the footprint that would register with a set of electrical contact features of the PCB design; and generates second XYRS data for the electrical component based at least on the determined X-Y position and orientation of the footprint.

An aspect of the disclosed embodiments is a non-transitory computer readable medium embodying a computer program executable on at least one processor for printed circuit board (PCB) component placement, the computer program including computer program code for receiving one or more electronic PCB design files defining a PCB design. The computer program further includes computer program code for processing the one or more electronic PCB design files to determine which PCB design features of the PCB design are electrical contact features. The computer program further includes computer program code for, for each electrical component of a plurality of electrical components to be assembled with the PCB design: determining whether a footprint of the electrical component positioned and oriented in accordance with first XYRS data for the electrical component would register with electrical contact features of the PCB design; in the event that the footprint of the electrical component positioned and oriented in accordance with first XYRS data for the electrical component would not register with electrical contact features of the PCB design: conducting a corrective procedure to determine an X-Y position and orientation of the footprint that would register with a set of electrical contact features of the PCB design; and generating second XYRS data for the electrical component based at least on the determined X-Y position and orientation of the footprint.

These and other aspects of the present disclosure are provided in the following detailed description of the embodiments, the appended claims, and the accompanying figures.

Figure 1:
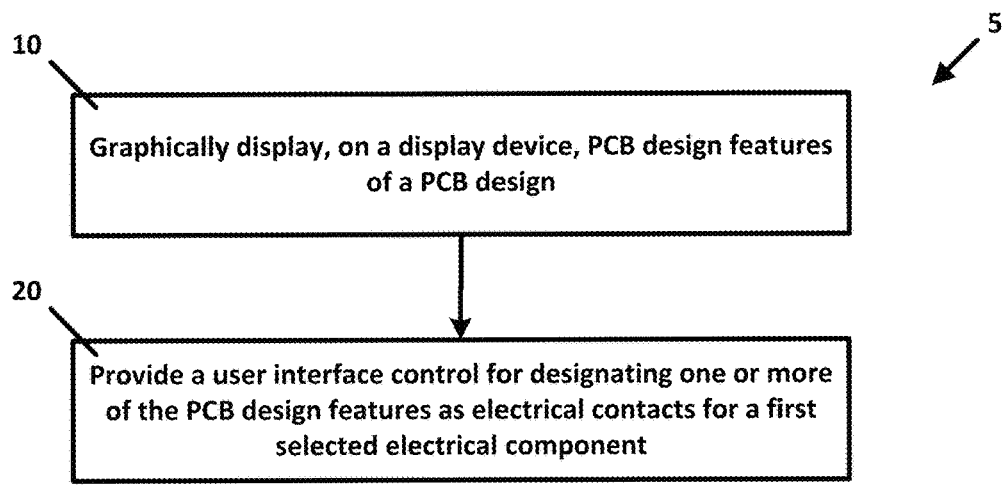
FIG. 1 is a flow diagram generally illustrating a printed circuit board (PCB) component placement method according to the principles of the present disclosure.

Other aspects and embodiments will become apparent upon reading the following description.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a printed circuit board (PCB) is a device designed to both physically support and electrically interconnect electronic components of a circuit or circuits of an electronic device. A PCB may include one or more layers of electrically conductive traces laminated atop respective surfaces of a non-conducting supportive substrate, and extending between electrically conductive component pads and/or electrically conductive vias formed through the substrate for electrically interconnecting multiple layers of the PCB. Electrical and electronic components such as transistors, resistors, capacitors, diodes, inductors, integrated circuits (ICs), light-emitting diodes (LEDs), power and/or signal sources and various other components may be electrically and physically connected to respective pads and/or vias of a PCB using an electrically conductive material such as solder, and/or to mechanical anchor points, thereby to assemble the circuit or circuits as a PCB assembly (PCBA).

Prior to assembly of the PCB with the components, a PCB may be manufactured using a number of process steps typically conducted using specialized PCB manufacturing equipment configured and operated by a PCB manufacturer. Such process steps may include selectively etching conductive material applied on at least one size of a suitably-sized piece of non-conductive substrate to form electrically conductive traces and pads, drilling vias and other functional holes through the substrate at respective locations, applying solder atop respective pads and/or vias, applying human and/or machine-readable information about component placement on the PCB, applying protective coatings atop appropriate regions of the PCB, and/or other process steps. Once a PCB is manufactured, components may be electrically and physically connected to the PCB using additional process steps/machinery, thereby to form a PCB assembly (PCBA).

A PCB design may be created by an engineer or other designer with the help of a computer aided design (CAD) software application that is configured to enable creation of the PCB design using a computer user interface (UI). Such a UI may be displayed on a display device such as a screen of a computing device, and may be interacted with using one or more input devices such as a mouse and/or keyboard of the computing device. Using the UI, a user may select and manipulate interconnections of various electrical/electronic components to form and depict a schematic representation of a desired circuit. Once the user is satisfied with the schematic representation, the same or different CAD software applications may then be used to depict and manipulate a physical representation of a PCB corresponding to the circuit represented by the schematic representation.

A physical representation of a circuit may include representations of the shapes, orientations and spatial positions of circuit components themselves with respect to each other and with respect to one or more PCBs. The physical representation may also include representations of the sizes and shapes of each substrate, the respective conductive pads, vias, conductive traces, mask(s), silkscreen(s), and other aspects to be formed on the each substrate or otherwise arranged with respect to the substrate for physically supporting and electrically interconnecting the components. A bill of materials (BOM) may be generated using the software application to provide a list of components and their specifications for sourcing and/or ordering, and to associate the components with particular locations and orientations with respect to the PCB. The physical representation and the BOM may be manipulated using the UI in various ways, thereby to define a computer model of the PCBA reflecting the user's intentions for its physical manufacture.

Once the user is satisfied with the computer model of the PCBA, the computer model may be exported as a set of standardized processor-readable files for downstream use. Each file may include data regarding a respective aspect of the computer model. For example, one file may specify draw/erase commands for conductive material for a first layer of a PCB, and another file may specify draw/erase commands for conductive material for a second layer of the PCB. Yet another file may specify draw/erase commands for solder mask for the first layer of the PCB, and yet another file may specify draw/erase commands for solder mask for the second layer of the PCB. Other files may respectively specify silkscreen layer content and locations for respective layers, drill hole sizes and locations and other aspects for vias through respective layers, component XYRS (X location, Y location, rotation/orientation, and side) placement data for respective sides, and/or other aspects. An outline file defining the PCB physical outline may be automatically generated based on the contents specified by the user for the layers, and included as part of the PCB design files.

PCB design files may be saved in a file system for later use, transmission to another computing device, inspection, subsequent modification of the computer model, and the like. Each file may be named according to its contents and/or in accordance with custom or standard so that it may be properly imported into another computing device, understood by a human user, used to properly configure equipment to manufacture the PCB and thereafter form the PCB and the PCBA, and otherwise used. Various file formatting standards for PCB designs are available, including the Gerber format and the ODB++ format.

While specifying a computer model of a PCBA using a CAD software application, a user may specify shapes, shape orientations, shape locations and other physical features to be included with each layer of the PCB design. For example, for a conductive layer, using the UI a user may specify the shapes and locations of conductive traces, conductive pads, and other electrically conductive features. For a mask layer, using the UI the user may specify the shapes and locations of features that are to block light from passing during a photolithography process. Conversely, the shapes and locations of features that are to permit light to pass during a photolithography process may be specified. For a silkscreen layer, using the UI the user may specify the shapes and locations of markings such as text and/or graphics to be applied to the PCB. When the PCB design files are generated, the features specified by the user may be encoded as draw/erase commands, each of which may include a draw tool change, a polarity change (draw or erase), and a coordinate. Such draw/erase commands are each generally suitable for instructing a manufacturing machine to conduct a draw/erase operation, such as to draw a silkscreen feature, or to etch a conductive material such as copper thereby to create a conductive feature. It is common for some users to include additional information, such as textual notes, tables, stackup diagrams, drill dimensions and/or other information. When such additional information is included as part of a layer or layers along with the physical features, it may be distinguished from physical features prior to manufacturing using a technique such as that described in U.S. patent application Ser. No. 17/376,204 to Hunter et al. filed on Jul. 15, 2021, entitled "METHODS AND SYSTEM FOR PRINTED CIRCUIT BOARD OUTLINE ESTIMATION AND APPROVAL", the contents of which are incorporated herein in their entirety.

As described above, it is common for the placement of electronic components on a PCB to be specified in the form of a table of X and Y coordinates along with rotation (R) and side (S) information. However, as any standards for establishing zero degrees of rotation of a component with respect to the PCB location tend not to be widely adhered to, it is common for components to be rotated incorrectly in the course of placement. Furthermore, X and Y coordinates are global for an entire panel of PCBs that are to be manufactured and, as such, these do not generally account for skew or manufacturing tolerances in the PCBs. As a result, components placed and/or oriented at associated specified coordinates and with associated specified rotation, without regard to the actual locations of electrical contact features (pads, vias, etc.) in the PCB design, can be placed incorrectly.

In particular, while some information about placement may be available in PCB design files, there may be no data in a particular set of otherwise-valid PCB design files that provides an explicit, universally-reliable/standardized format for codifying a linkage between a particular electrical lead of a particular component and a particular electrical contact feature of the PCB design, or between a footprint of a particular electrical component and a set of electrical contact features that the particular electrical component might be intended by a designer to register with. Layer information in PCB design files may be encoded by the CAD software as draw/erase commands, rather than as physical features such as electrical contact features, traces and masks, such that the PCB design files would not generally support explicit linkages of an electrical component or its leads with such physical features of the PCB design.

FIG. 1 is a flow diagram generally illustrating a printed circuit board (PCB) component placement method 5 according to the principles of the present disclosure. In some embodiments, at 10, PCB design features of a PCB design are graphically displayed on a display device. Representation of the PCB design features of the PCB design may be automatically generated by processing contents of one or more electronic files constituting a PCB design. Such a file or files may be received from a user by providing a user interface for inputting the PCB design files prior to graphically displaying the PCB design features. For example, a user interface screen may be provided enabling a user to upload PCB design files individually or as a set, so that a local and/or remote computing device may process the PCB design file or files to generate the representation. Such PCB design files may be Gerber design files, ODB++ design files, or PCB design files encoded according to some other schema or standard for representing layers of the PCB design. Such PCB design files may include first XYRS data for each of a plurality of electrical components.

At 20, a user interface control for designating one or more of the PCB design features as electrical contacts for a first selected electrical component is provided. Such a user interface control may include one or more selectable PCB design features that, when selected using a mouse or other device, is/are presented as graphically distinct from other PCB design features thereby to indicate that it/they has/have been designated as an electrical contact(s) for the first selected electrical component.

Displaying PCB design features designated as electrical contact features for the electrical component may be conducted by displaying such designated electrical contact features in a graphically distinct colour or colours and/or a graphically distinct contrast and/or with a graphically distinct transparency, than are displayed those other PCB design features not designated. Various combinations of graphical displays may be provided (i.e., distinct contrasts, distinct contrasts and distinct colors, for examples), may be provided. Furthermore, a user may be provided with options for choosing between different ways of displaying the distinctions between those PCB design features that are designated as electrical contact features for a selected electrical component and those that are not. A user may be provided with a user interface control for toggling between different ways of displaying the distinctions and/or between displaying the distinctions and not displaying the distinctions, enabling the user to manipulate the user interface, as the user wishes.

In embodiments, selectable PCB design features may be only those of the PCB design features of the PCB design that had been automatically determined to be electrical contact features, in contrast to PCB design features that may be conductive traces, mask features, etc.

In some embodiments, based at least on the designating, second XYRS data is automatically generated by an XYRS generator executing on one or more processors for the first selected electrical component. In some embodiments, the first XYRS data for the first selected component is replaced with the second XYRS data for the first selected component. In particular, data within a PCB design file containing XYRS data for at least the first component may be modified to replace the first XYRS data for the first selected component with the second XYRS data for the first selected component.

In some embodiments, automatically generating the second XYRS data for the first selected electrical component includes defining a placement area for the first selected electrical component based at least on relationships between X-Y positions of the PCB design features that were designated as electrical contacts for the first selected electrical component with respect to an X axis and a Y axis of the PCB design. Such a placement area may be an area of the PCB design that tightly encompasses the designated electrical contact features. In embodiments, a search are may be defined by taking the largest dimension of the bounding box of the footprint being searched for and using half the dimension values to establish a search radius centred on the first XYRS X-Y coordinate. A buffer may be added to account for slight variations in electrical contact feature dimension or offsets in X-Y values. For example, if two (2) PCB design features are designated as electrical contacts, and the two PCB design features may each be defined in terms of four vertices (square or rectangular conductive pads, for example), then a placement area may be defined as a single polygon that would encompass the eight (8) total vertices. With a placement area having been defined, an X-Y position and an orientation for a footprint of the first selected electrical component that would cause the footprint to register with the placement area may be determined.

In this description, a footprint of an electrical component is a two-dimensional polygon representing a projection of the electrical component onto the PCB design. A footprint may include data defining which portion of the footprint corresponds to first electrical lead (i.e. a "Pin1") of the electrical component it represents, to enable determination of a rotational orientation of the electrical component in the event that rotational orientation cannot be determined in another manner. For example, if a component is symmetrical across one or more axes and correct circuit functionality depends on the component being placed at a particular orientation with respect to electrical contact features with which it is to connect, the data defining which portion of the footprint corresponds to the first electrical lead of the electrical component enables the correct orientation of the footprint, and thus the electrical component, to be determined.

In this description, registration of the footprint with the placement area refers to projecting the footprint onto the placement area at a position and rotation such that the footprint would generally best fit within the placement area and with minimal overlap/underlap when compared with alternative positions and/or rotations. In some embodiments, the second XYRS data is generated based on the determined X-Y position and orientation of the footprint.

In some embodiments, in addition to providing the user interface control for designating, a user interface for associating a PCB design feature with a first electrical lead of the first selected electrical component may be provided. Such a user interface for associating may be provided prior to generating the second XYRS data. It will be appreciated that some kinds of electrical components may be connected with designated electrical contact features in multiple orientations without affecting operation of a circuit. For example, it is known that the two electrical leads of a resistor component may be connected with one or the other electrical contact feature between which the resistor component is meant to extend, without affecting circuit operation. As such, in some embodiments, second XYRS data for non-polar components may be generated without providing a user interface control for associating a PCB design feature with a first electrical lead. However, in some embodiments, a user interface for associating a PCB design feature with a first electrical lead of the first selected electrical component may be provided whether or not the first selected electrical component would work differently in one orientation or another. However, it will be appreciated that some kinds of electrical components must be connected with designated electrical contact features in only one orientation. Examples of such components include diodes, transistors, integrated circuits, and other components. The utility of providing a user interface control for associating a PCB design feature—in particular an electrical contact feature—with a first electrical lead of the first selected electrical component is to provide the user with the ability to select to which of the electrical contact features a "Pin1" of the first selected electrical component is to be electrically connected. In this way, if there were multiple X-Y positions/orientations of the first selected electrical component that would register with the placement area, a user's selection of the first electrical lead—the "Pin1" of the component, for example—would specify which one of the multiple X-Y positions/orientations the second XYRS data should be generated on the basis of. From the point of view of automatically generating the second XYRS data, the determined X-Y position and orientation for the footprint of the first selected electrical component would also cause the PCB design feature associated with the first electrical lead of the first selected electrical component to register with a portion of the footprint that corresponds to the first electrical lead.

In some embodiments, the user is required to engage with the user interface control for designating, prior to permitting the user to engage with the user interface control for associating. In some embodiments, the user interface control for associating permits associating with the first electrical lead of the first selected electrical component only one of the PCB design features designated, using the user interface control for designating, as electrical contacts for the first selected electrical component. In this way, the set of possible PCB design features being displayed that could be associated by the user with the first electrical lead of the first selected electrical component is constrained to only those PCB design features designated as electrical contact features for the first selected electrical component.

In some embodiments, prior to graphically displaying the PCB design features of the PCB design, at least the first XYRS data for the first selected electrical component may be processed by a region estimator executing on one or more processors to estimate a region of the PCB in which the first selected electrical component is to be placed. During graphically displaying the PCB design features, the display device may be caused to zoom in to display only a subset of the PCB design features that are located in the estimated region, in contrast to displaying all PCB design features of the PCB design at once. Zooming in to only a subset of the PCB design features located in the estimated region may make it easier for a user to designate PCB design features as electrical contact features for the first selected electrical component. For example, for a PCB design incorporating dozens or hundreds of electrical components each requiring multiple electrical contact features, zooming towards the estimated region eases the process by which a user can hone in on a subset of the electrical contact features from which a user is more likely to choose to designate as electrical contact features for the first selected electrical component. Zooming in may also make it physically easier for the user to use the user interface control to designate the PCB design features as electrical contact features for the first selected electrical component. For example, if a user is to use a computer mouse and cursor to select a PCB design feature as an electrical contact feature, this may be easier if the PCB design feature is zoomed-in on due to it being larger on the display.

In some embodiments, the estimated region may be defined as a shape such as a rectangle, square, circle or other shape centred at the X-Y position specified by the first XYRS data for the first selected electrical component. In some embodiments, such a shape has an area that is significantly larger than an area that would only just encompass the footprint of the first electrical component were it positioned according to the first XYRS data, but is smaller than an area that would encompass all of the PCB design features of the PCB design. An estimated region having such an area into which to zoom may provide a user with a sufficient contextual information to enable the user to designate certain PCB design features within the estimated region as being electrical contact features for the first selected electrical component, as well as to enable the user to regard certain other PCB design features within the estimated region as not being electrical contact features or as being electrical contact features not to be designated as electrical contact features for the first selected electrical component (that is, to be regarded as electrical contact features for some other electrical component). In some embodiments, the area of the estimated region may be 2×, 3×, 4× . . . 10× or more times the size of an area that would tightly encompass the footprint, or may be some other integer or non-integer multiple of such an area.

In some embodiments, after providing a user interface control for designating one or more of the PCB design features as electrical contacts for a first selected electrical component, the method may include graphically displaying, on the display device, PCB design features of the PCB design and providing a user interface control for designating one or more of the PCB design features as electrical contacts for another selected electrical component. In this manner, the method may step through a plurality of selected electrical components, providing such a user interface control for designating and, in some embodiments, a user interface control for associating, for each of the plurality of selected electrical components. In some embodiments, second XYRS data is generated for each such selected electrical component.

In some embodiments, the method may calculate a first offset between the first XYRS data and the second XYRS data. In some embodiments, the method may provide a user interface control for designating one or more of the PCB design features as electrical contacts for a second selected electrical component. Third XYRS data may be received for the second selected electrical component prior to graphically displaying, on the display device, the PCB design features of the PCB design and fourth XYRS data for the second selected electrical component may be automatically generating based at least on the designating. The method may calculate a second offset between the third XYRS data and the fourth XYRS data. In some embodiments, responsive to the first offset matching with the second offset, the method may provide a user interface option to automatically generate additional XYRS data for each of at least one additional component based on the first offset. In particular, the method may detect that a user designated PCB design features as electrical contact features for the first selected electrical component and the second selected electrical component such that any difference between the X values in the first XYRS data and the second XYRS data is the same as the difference between the X values in the third XYRS data and the fourth XYRS data, any difference between the Y values in the first XYRS data and the second XYRS data is the same as the difference between the Y values in the third XYRS data and the fourth XYRS data, and any difference between the R values in the first XYRS data and the second XYRS data is the same as the difference between the R values in the third XYRS data and the fourth XYRS data. Such a user interface control may be a YES/NO option, a checkbox option, or some other user interface control that enables a user to register an approval or a disapproval. In order to provide the user interface option, a pop-up dialog box may be displayed on the display device enabling a user to select whether or not to authorize the method to generate such additional XYRS data for additional components automatically. In this manner, the method, upon detecting that a first offset calculated between first XYRS data and second XYRS data for a first selected electrical component is the same as an offset calculated between third XYRS data and fourth XYRS data for a second selected component, may inform the user of an apparent trend in offsets and may accordingly provide the user with the ability to apply a global "correction" to the XYRS data for all of the electrical components in the BOM based on the apparent trend. In this manner, the user would be provided with an opportunity to avoid what may be a tedious process of individually designating electrical contact features for each of a large number of selected electrical components. In response, the method may apply the first offset to the XYRS data received for each component in the PCB design files to generate modified/replacement XYRS data for each electrical component. In some embodiments, a user provided with such a user interface option may decline the option to continue with the more manual designation. In some embodiments, responsive to the first offset matching with the second offset, a global correction may be automatically applied without first having provided a user interface option. In some embodiments, offsets calculated for more than two components may be required to be matching before the method provides the user interface option or automatically applying such offsets to the XYRS data of other electrical components.

As used throughout this disclosure, the terms "match", "match with", or "matches with" may refer to an exact match, a correlative match, a substantial match, a statistically measured match, etc.

It will be appreciated that not all PCB design features of a PCB design are electrical contact features. It may be useful to automatically distinguish electrical contact features of a PCB design from other kinds of PCB design features. Distinguishing electrical contact features from other PCB design features may equip a user interface control to enable only the designation of electrical contact features as electrical contact features for a selected electrical component, so that a user does not inadvertently designate a PCB design feature that is not an electrical contact feature (such as a trace, or masked area, etc.) as an electrical contact feature for the selected electrical component. Furthermore, distinguishing electrical contact features from other PCB design features may enable automatic processing using electrical contact features only.

Figure 2:
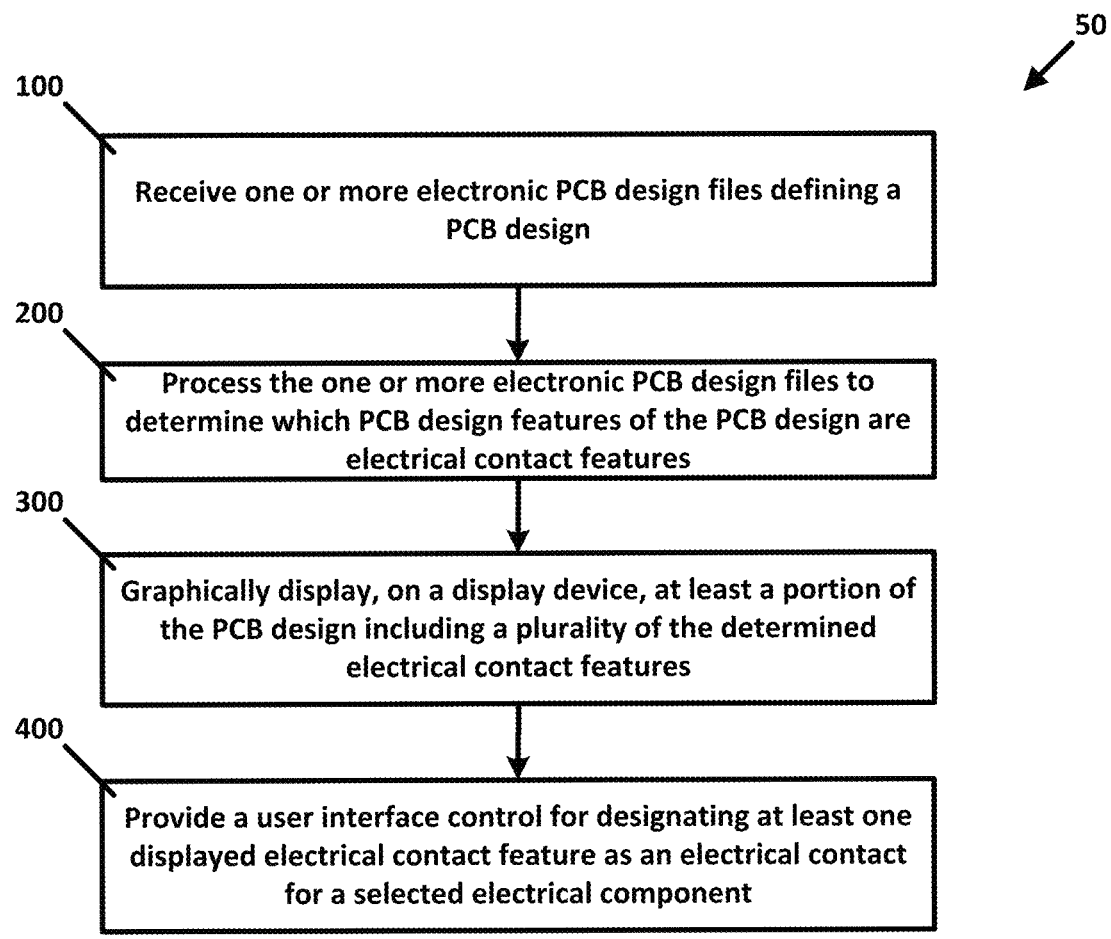
FIG. 2 is a flow diagram generally illustrating another printed circuit board (PCB) component placement method according to the principles of the present disclosure.

FIG. 2 is a flow diagram generally illustrating another printed circuit board (PCB) component placement method 50 according to the principles of the present disclosure. In some embodiments, at 100, one or more electronic PCB design files defining a PCB design is/are received. At 200, the one or more electronic PCB design files are processed by a contact process executing on one or more processors to determine which PCB design features of the PCB design are electrical contact features. At 300, at least a portion of the PCB design including a plurality of the determined electrical contact features are graphically displayed on a display device. At 400, a user interface control for designating at least one displayed electrical contact features as an electrical contact feature for a selected electrical component is provided.

The processing may be conducted at least in part by one or more computing devices using contents of the one or more electronic PCB design files, using processing techniques described herein and/or some other processing techniques. Such processing may be done by one or more computing devices physical local to the display device and/or by one or more remote computing devices in communication via a communications network with the computing device local to and/or driving the display device.

In some embodiments, at least some of the electrical contact features in the PCB design may be identified based at least on relative positioning of conductive and mask layer features in the PCB design. Conductive layer features may, for example, be encoded within a PCB design file designated for conductive material as draw/erase commands for the conductive material. Mask layer features may, for example, be encoded within another PCB design file designated for mask material (or designated for patterns of exclusions that should be formed in the mask material) as draw/erase commands for the mask material (or for the patterns of exclusions that should be formed in the mask material). In some embodiments, converting conductive and mask draw commands in the PCB design files to conductive and mask polygons includes converting each of the conductive draw/erase commands into individual conductive polygons, and converting mask draw commands into individual mask polygons. For example, conductive draw commands in a conductive layer PCB design file may be processed to generate conductive polygons each defined in terms of multiple vertices in a coordinate system for the PCB design. Similarly, mask draw commands in a mask layer PCB design file may be processed to generate mask polygons each defined in terms of multiple vertices in the coordinate system. It will be appreciated that it may be intended that a coating be applied to the entirety of a PCB with the exception of particular locations corresponding, for example, to electrical contact features such as conductive pads or vias that need to be accessed during assembly thereby to connect electronic components to the electrical contact features. The mask polygons may therefore generally represent these particular "no-coating" locations, rather than "coating" locations.

Gerber files may generally include, on each line, a draw or erase command that specifies a stencil or shape (a draw tool change), a polarity change (erase vs. draw) and a command to run the specified draw tool at a particular coordinate. The draw/erase commands for each of the PCB design files representing the conductive and mask layers are converted to represent the commands as individual polygons.

In some embodiments, the individual conductive polygons are combined to form the combined conductive polygons located at respective locations, and the individual mask polygons are combined to form the combined mask polygons located at respective locations. The combining of individual polygons into a reduced number of combined polygons may be conducted using a computational technique. For example, a sweep line algorithm may be used to create combined polygons by processing individual polygons that, based on their shape, size and locations, are coincident or intersecting. Furthermore, each of the combined polygons may be associated with a list of hole polygons that are encompassed within them. For example, a particular group of draw commands for a conductive layer may be combined to define one or more combined "draw" polygons, and a particular group of erase commands for the conductive layer may be combined to define one or more "erase" polygons. An erase polygon that is sized, shaped and positioned to be encompassed within a particular draw polygon is associated with the draw polygon as a hole within the draw polygon.

Some PCB design file formats, such as Gerber, may permit the definition of draw/erase commands on top of older/previous draw/erase commands. A number of such draw/erase commands may therefore be stacked in respect of a particular physical location. In some embodiments, draw/erase commands may be grouped programmatically into composite levels, and the sweep line algorithm run over each composite level thereby to draw on top of a previous composite level result. That is, for all composite groups, a composite result is equal to the combination of the result (if not null), plus all composite polygons and holes at a current iteration.

Figure 3:
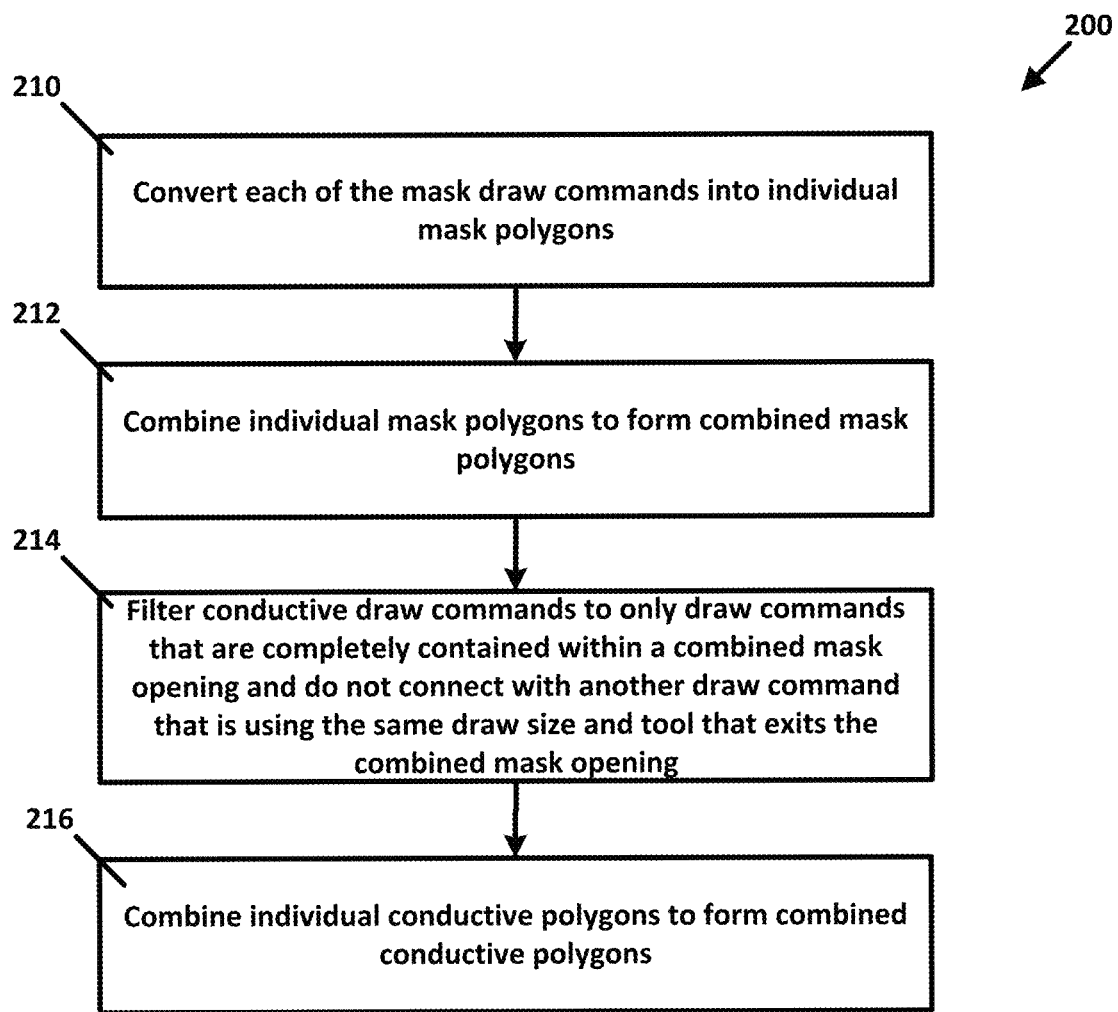
FIG. 3 is a flow diagram generally illustrating steps in an embodiment of the processing in FIG. 2.

In some embodiments, for determining which PCB design features are electrical contact features, individual mask polygons and individual conductive polygons may be processed differently prior to combination. FIG. 3 is a flow diagram generally illustrating steps in an embodiment of the processing 200 in FIG. 2. At 210, each of the mask draw commands are converted into individual mask polygons. At 212, the individual mask polygons are combined—such as for example using the sweep line algorithm described above—to form combined mask polygons. At 214, the method filters conductive draw commands to only draw commands that are completely contained within a combined mask opening and do not connect with another draw command that is using the same draw size and tool that exits the combined mask opening. At 216, the individual conductive polygons to which such conductive draw commands were converted are then combined—such as for example using the sweep line algorithm described above—to form combined conductive polygons.

While in embodiments disclosed herein a user interface control may be provided to enable a user to designate electrical contact features for a selected electrical component and/or associate an electrical contact feature with a first electrical contact of a selected electrical component, in some embodiments automatic designation and/or association may be conducted based on feature matching of multiple electrical contact features in a particular region with a footprint of a selected electrical component that according to its first XYRS data is to be placed within the region.

Figure 4:
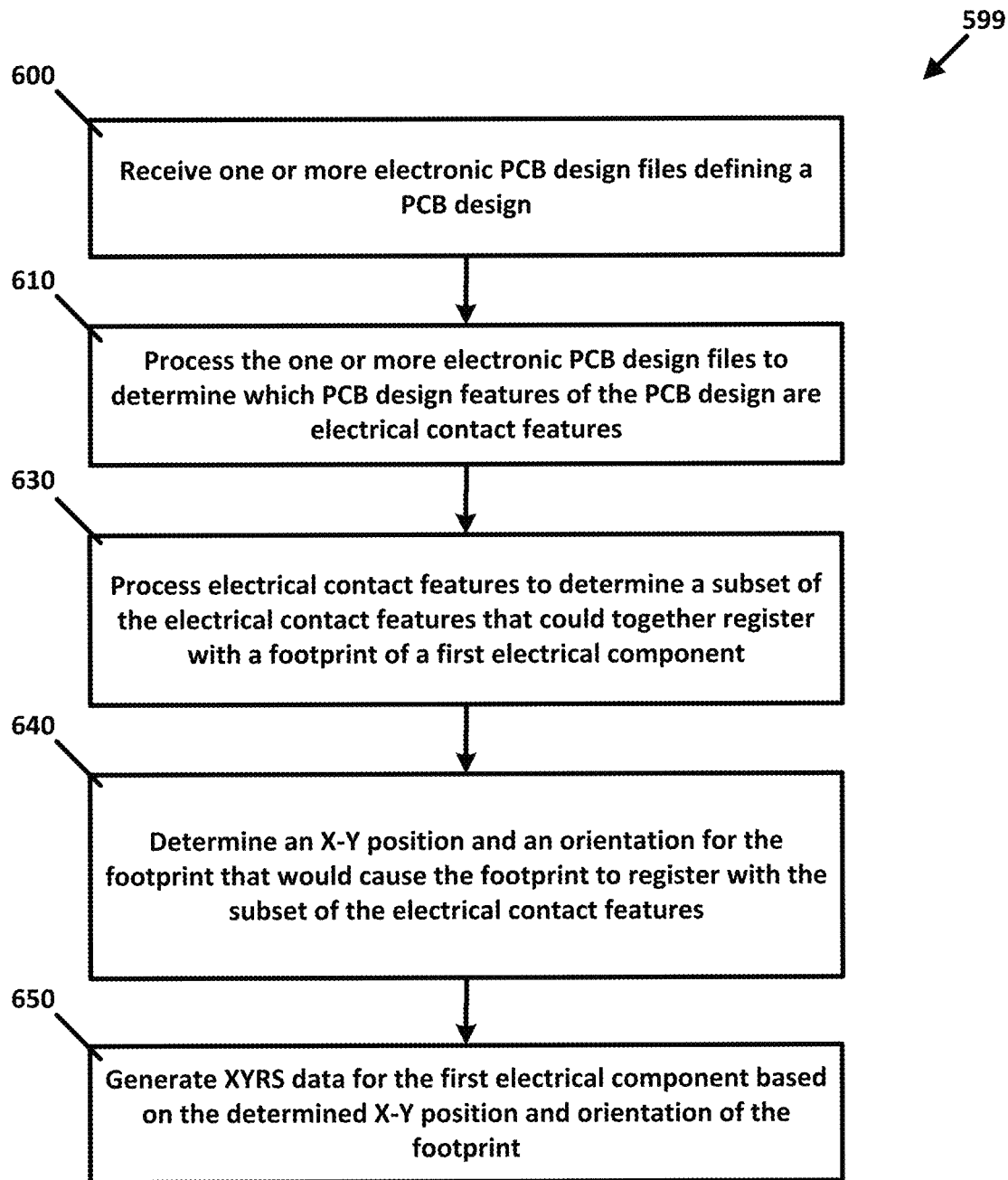
FIG. 4 is a flow diagram generally illustrating another printed circuit board (PCB) component placement method according to the principles of the present disclosure.

FIG. 4 is a flow diagram generally illustrating another printed circuit board (PCB) component placement method 599 according to the principles of the present disclosure. In some embodiments, one or more electronic PCB design files defining a PCB design are received 600. In some embodiments, the one or more electronic PCB design files are processed to determine which PCB design features of the PCB design are electrical contact features 610. Processes such as those described herein for distinguishing between PCB design features that are electrical contact features and PCB design features that are not may be used to make this determination.

In some embodiments, at 630, electrical contact features are processed by a cluster processor executing on one or more processors to determine a subset of the electrical contact features that could together register with a footprint of the first electrical component. In some embodiments, a process may trial different clusters of electrical contact features in the PCB design to determine which of the clusters best corresponds in collective size and shape, number of contacts to the size and shape and number of electrical leads of the footprint of the first electrical component. For example, if the PCB design contains five (5) PCB design features determined to be electrical contact features, and the first electrical component has a rectangular footprint of a particular length and width with two (2) electrical leads, a process may trial different clusters each of two (2) of the five electrical contact features in the PCB design to identify a cluster of electrical contact features X-Y spaced from each other and oriented with respect to each other to together fit within a shape that would register with the rectangular footprint. As another example, if the PCB design contains five (5) PCB design features determined to be electrical contact features, and the first electrical component has a square footprint of a particular length and width with four (4) electrical leads, a process may trial different clusters each of four (4) of the five electrical contact features spaced and oriented with respect to each other to register with the square footprint. At 640, an X-Y position and orientation for the footprint that would cause the footprint to register with the subset of the electrical contact features is determined by a location processor executing on one or more processors and, at 650, the location processor generates second XYRS data for the first electrical component based on the determined X-Y position and orientation of the footprint.

In some embodiments, the PCB design files are processed to estimate a region of the PCB design in which the first electrical component is to be placed. For example, XYRS data in the PCB design files may be used to estimate such a region, such that the processing of electrical contact features to determine a subset of electrical contact features that could together register with the footprint is done only with electrical contact features within the estimated region, rather than across the whole PCB design. Variations are possible.

In some embodiments, prior to automatically generating the second XYRS data, a user interface control for associating an electrical contact feature in the subset of electrical contact features with a first electrical lead of the first electrical component may be provided. In particular, there may be multiple rotational orientations of the footprint of the first electrical component that would register with a particular subset of electrical contact features, with only one of the rotational orientations being correct for ensuring that the electrical leads of the first electrical component will be electrically connected to the appropriate electrical contact feature. While, as described above, a non-polar electrical component such as a resistor may function correctly in either orientation, many other electrical components would not. As such, a "Pin1" of a polar electrical component must connect with a single correct electrical contact feature. Furthermore, a user may prefer, even for a non-polar electrical component such as a resistor, that the electrical component be oriented in a particular way. Providing the user interface control for associating, even though a user interface for designating may not be required in some embodiments as described above, may enable a user to disambiguate the orientation of an electrical component thereby to reduce the risk that it is placed at a wrong orientation. In particular, the determined X-Y position and orientation for the footprint of the first electrical component would also cause the electrical contact feature associated with the first electrical lead of the first electrical component to register with a portion of the footprint that corresponds to the first electrical lead (i.e., a "Pin1").

Figure 5:
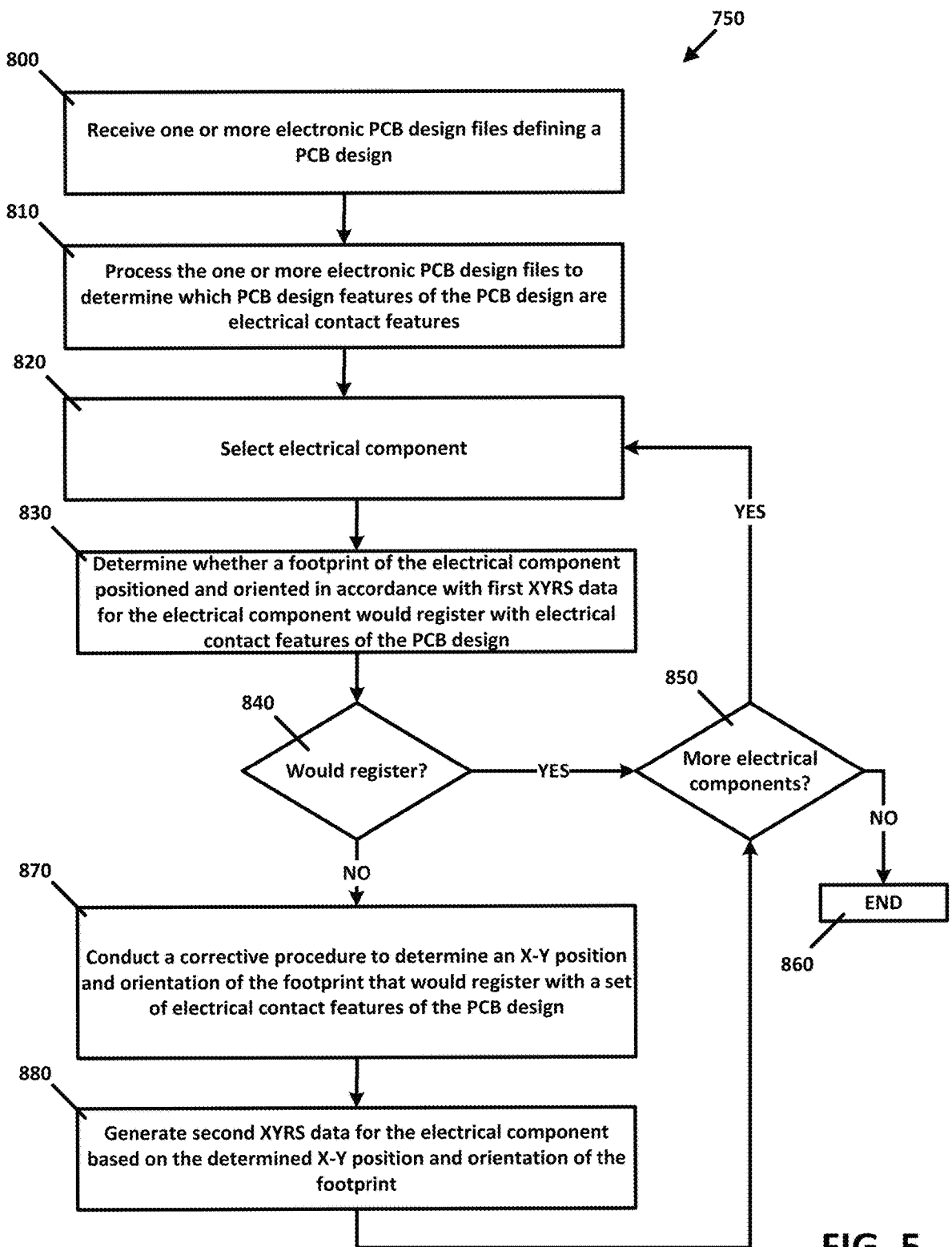
FIG. 5 is a flow diagram generally illustrating another printed circuit board (PCB) component placement method according to the principles of the present disclosure.

For a given PCB design, it may be useful to enable correction, as described herein, of XYRS data for some electrical components without necessarily correcting XYRS data for all electrical components. As such, distinguishing between electrical components whose XYRS data may need correction, clarification or disambiguation, and electrical components that do not, may be useful. FIG. 5 is a flow diagram generally illustrating another printed circuit board (PCB) component placement method 750 according to the principles of the present disclosure. In some embodiments, at 800, one or more electronic PCB design files defining a PCB design are received. In some embodiments, the one or more electronic PCB design files are processed to determine which PCB design features of the PCB design are electrical contact features. Processes such as those described herein for distinguishing between PCB design features that are electrical contact features and PCB design features that are not may be used to make this determination. At 820, an electrical component is selected for further processing by a registration process executing on one or more processors. Selection of the electrical component may be conducted by selecting an electrical component from a BOM design file of the PCB design files. At 830, it is determined by the registration process whether a footprint of the selected electrical component, positioned and oriented in accordance with first XYRS data for the selected electrical component would register, as described herein, with electrical contact features of the PCB design. It will be appreciated that the first XYRS data for the selected electrical component would be determined from the XYRS data in the PCB design files. At 840, if the footprint of the selected electrical component, positioned and oriented in accordance with first XYRS data for the selected electrical component would indeed register with electrical contact features of the PCB design, method 750 proceeds to 850 at which it is determined if there are more electrical components to select. In the event that there are no further electrical components to select, method 750 ends at 860. On the other hand, if there are further electrical components to select, the process proceeds to 820 to select another electrical component.

At 840, if the footprint of the selected electrical component, positioned and oriented in accordance with first XYRS data for the selected electrical component would not register with electrical contact features of the PCB design, method 750 proceeds to 870 at which method 750 conducts a corrective procedure the determine an X-Y position and orientation of the footprint of the selected electrical component that would register with a set of electrical contact features of the PCB design. At 880, second XYRS data for the electrical component is generated based on the determined X-Y position and orientation of the footprint. Method 750 then proceeds to 850 at which it is determined if there are more electrical components to select. In the event that there are no further electrical components to select, method 750 ends at 860. On the other hand, if there are further electrical components to select, the process proceeds to 820 to select another electrical component.

In some embodiments, conducting a corrective procedure may include soliciting user input as to the electrical contact features for the selected electrical component, may include automatically designating electrical contact features and/or associating an electrical contact feature with a first electrical lead of the selected electrical component, or may include a combination of soliciting user input and automatic designation and/or association.

For example, in some embodiments, conducting a corrective procedure to determine an X-Y position and orientation of the footprint that would register with a set of electrical contact features of the PCB design includes graphically displaying, on a display device, at least a portion of the PCB design including a plurality of the determined electrical contact features, and providing a user interface control for designating at least one displayed electrical contact feature as an electrical contact for the electrical component. In some embodiments, the user may be requested to designate multiple electrical contact features for the electrical component. In some embodiments, the user may be requested to designate multiple contact features for the electrical component and to associate one of the designated contact features with a first electrical lead of the selected electrical component thereby to aid in determining correct orientation of the selected electrical component with respect to the designated electrical contact features.

As another example in which user interaction may not be required or may be required in part, in some embodiments, conducting a corrective procedure to determine an X-Y position and orientation of the footprint that would register with a set of electrical contact features of the PCB design includes processing at least the first XYRS data of the electrical component to estimate a region of the PCB design in which the electrical component is to be placed. Electrical contact features within the region may be processed to determine the set of electrical contact features in the region that could together register with the footprint. An X-Y position and an orientation for the footprint that would cause the footprint to register with the determined set of electrical contact features may then be determined. A user interface control for associating one of the electrical contact features with a first electrical lead of the electrical component may be provided to aid in determining correct orientation of the selected electrical component with respect to the designated electrical contact features.

Figure 6:
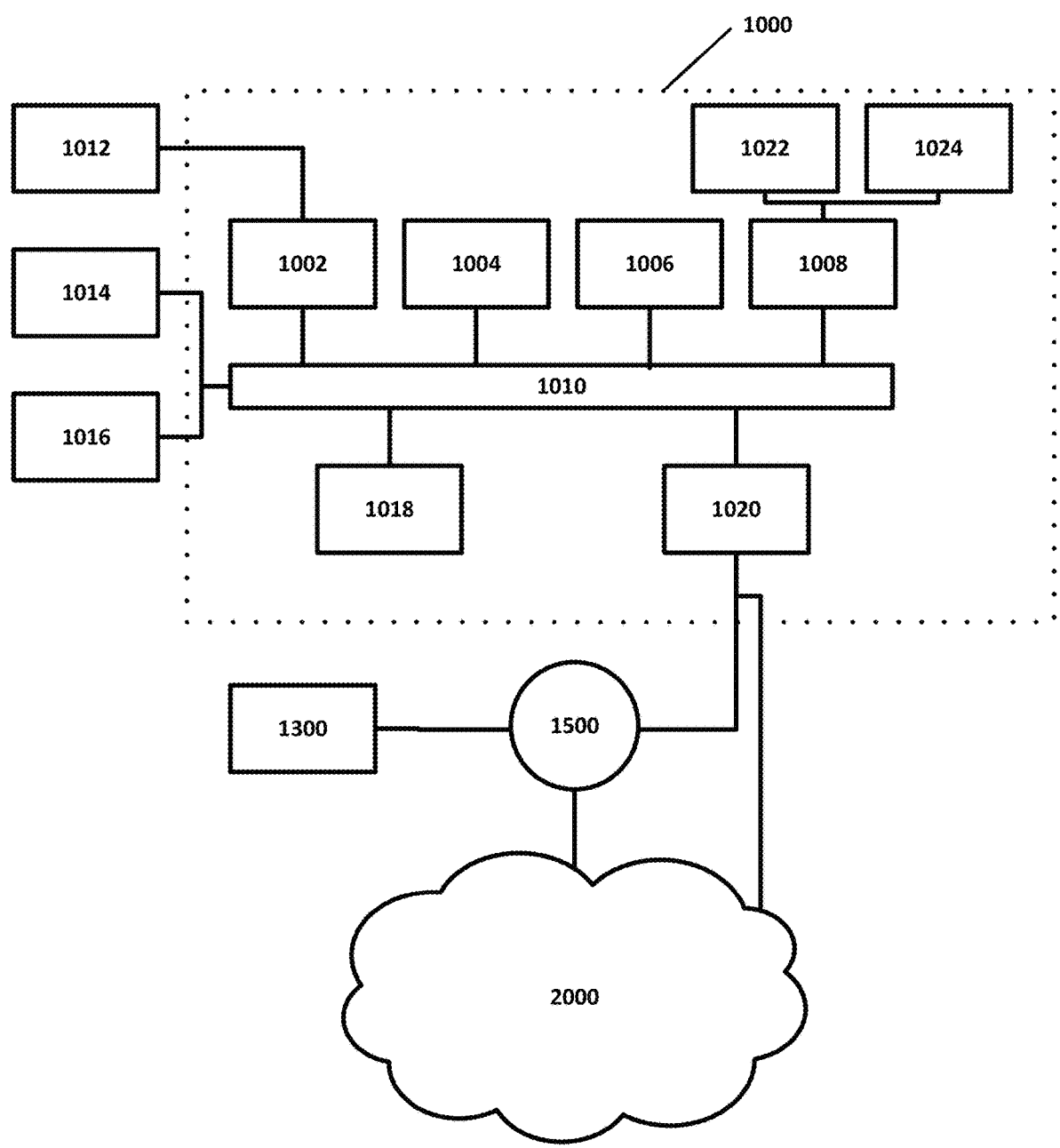
FIG. 6 is a schematic diagram showing a hardware architecture of a computing system 1000 configurable to implement aspects of the PCB component placement methods, in some embodiments.

FIG. 6 is a schematic diagram showing a hardware architecture of a computing system 1000 configurable to implement aspects of the PCB outline approval method, in some embodiments. Computing system 1000 is suitable as the hardware platform for a computing device configured to implement aspects of the PCB outline approval method, in some embodiments. In some embodiments, such a computing device may be a server with which a user on a remote computing device interacts via a web browser or other application software to carry out the steps described herein. In some embodiments, such a computing device may be the computing device with which a user interacts locally via a web browser or other application software to carry out the steps described herein.

Computing system 1000 includes a bus 1010 or other communication mechanism for communicating information, and a processor 1018 coupled with the bus 1010 for processing the information. The computing system 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The computing system 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

Computing system 1000 also includes a disk controller 1008 coupled to the bus 1010 to control one or more storage devices for storing information and instructions, such as a magnetic hard disk 1022 and/or a solid state drive (SSD) and/or a flash drive, and a removable media drive 1024 (e.g., solid state drive such as USB key or external hard drive, floppy disk drive, read-only compact disc drive, read/write compact disc drive, compact disc jukebox, tape drive, and removable magneto-optical drive). The storage devices may be added to the computing system 1000 using an appropriate device interface (e.g., Serial ATA (SATA), peripheral component interconnect (PCI), small computing system interface (SCSI), integrated device electronics (IDE), enhanced-IDE (E-IDE), direct memory access (DMA), ultra-DMA, as well as cloud-based device interfaces).

Computing system 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

Computing system 1000 also includes a display controller 1002 coupled to the bus 1010 to control a display device (or, "display") 1012, such as an LED (light emitting diode) screen, organic LED (OLED) screen, liquid crystal display (LCD) screen or some other device suitable for displaying information to a computer user. In embodiments, display controller 1002 incorporates a dedicated graphics-processing unit (GPU) for processing mainly graphics-intensive or other parallel operations. Such operations may include rendering by applying texturing, shading and the like to wireframe objects including polygons such as spheres and cubes thereby to relieve processor 1018 of having to undertake such intensive operations at the expense of overall performance of computing system 1000. The GPU may incorporate dedicated graphics memory for storing data generated during its operations, and includes a frame buffer RAM memory for storing processing results as bitmaps to be used to activate pixels of display 1012. The GPU may be instructed to undertake various operations by applications running on computing system 1000 using a graphics-directed application-programming interface (API) such as OpenGL, Direct3D and the like.

Computing system 1000 may include input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. The computing system 1000 may employ a display device that is coupled with an input device, such as a touch screen. Other input devices may be employed, such as those that provide data to the computing system via wires or wirelessly, such as gesture detectors including infrared detectors, gyroscopes, accelerometers, radar/sonar and the like. A printer may provide printed listings of data stored and/or generated by the computing system 1000.

Computing system 1000 performs a portion or all of the processing steps discussed herein in response to the processor 1018 and/or GPU of display controller 1002 executing one or more sequences of one or more instructions contained in a memory, such as the main memory 1004. Such instructions may be read into the main memory 1004 from another processor readable medium, such as a hard disk 1022 or a removable media drive 1024. One or more processors in a multi-processing arrangement such as computing system 1000 having both a central processing unit and one or more graphics processing unit may also be employed to execute the sequences of instructions contained in main memory 1004 or in dedicated graphics memory of the GPU. In alternative embodiments, hard-wired circuitry, such as an Application Specific Integrated Circuit (ASIC), may be used in place of or in combination with software instructions.

As stated above, computing system 1000 includes at least one processor readable medium or memory for holding instructions programmed according to the teachings of the description and for containing data structures, tables, records, or other data described herein. Examples of processor readable media are solid state devices (SSD), flash-based drives, compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of processor readable media, is software for controlling the computing system 1000, for driving a device or devices to perform the functions discussed herein, and for enabling computing system 1000 to interact with a human user. Such software may include, but is not limited to, device drivers, operating systems, development tools, and applications software. Such processor readable media further includes the computer program product for performing all or a portion (if processing is distributed) of the processing performed discussed herein.

The computer code devices discussed herein may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

A processor readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications using various communications protocols.

Various forms of processor readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a wired or wireless connection using a modem. A modem local to the computing system 1000 may receive the data via wired Ethernet or wirelessly via Wi-Fi and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

Computing system 1000 also includes a communication interface 1020 coupled to the bus 1010. The communication interface 1020 provides a two-way data communication coupling to a network link that is connected to, for example, a local area network (LAN) 1500, or to another communications network 2000 such as the Internet. For example, the communication interface 1020 may be a network interface card to attach to any packet switched LAN. As another example, the communication interface 1020 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information.

The network link typically provides data communication through one or more networks to other data devices, including without limitation to enable the flow of electronic information. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc.). The signals through the various networks and the signals on the network link and through the communication interface 1020, which carry the digital data to and from the computing system 1000, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different from baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

Alternative configurations of computing system may be used to implement the systems and processes described herein.

Electronic data stores implemented in the database described herein may be one or more of a table, an array, a database, a structured data file, an XML file, or some other functional data store, such as hard disk 1022 or removable media 1024.

Figure 7:
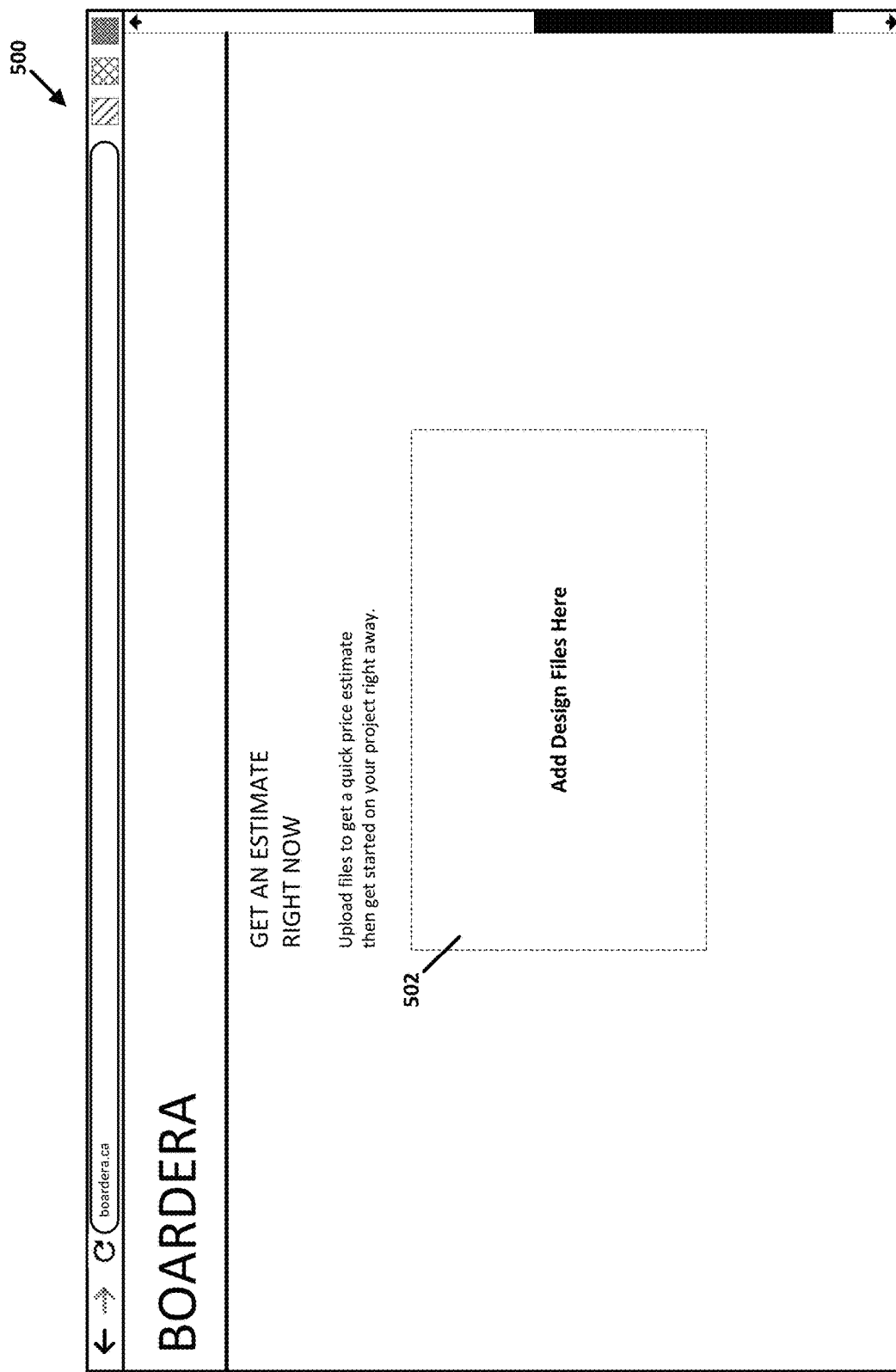
FIG. 7 is a user interface provided on a display device for allowing input into a computing system of PCB design files for processing to automatically generate a PCB and/or PCBA cost estimate.
Figure 8:
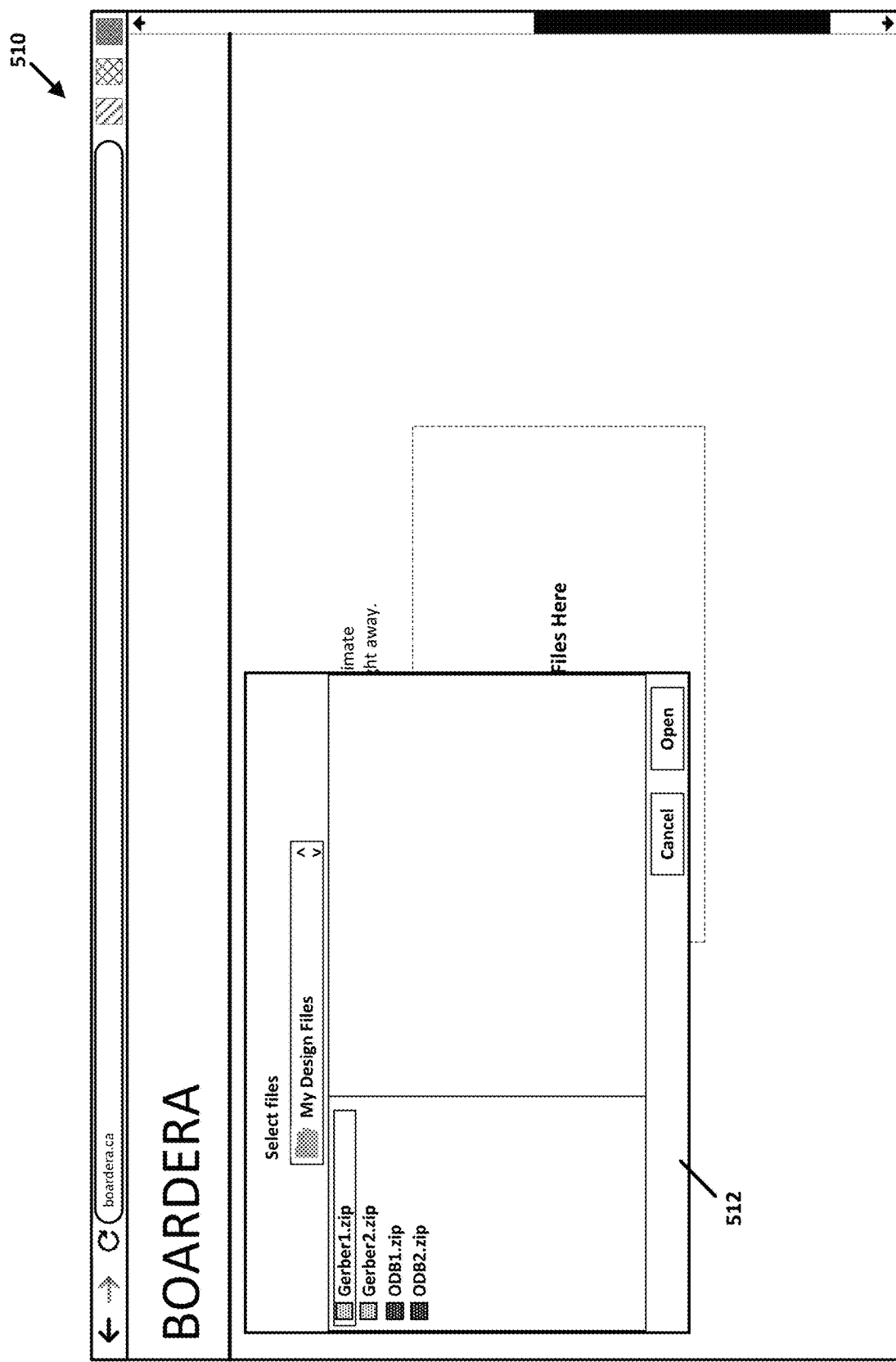
FIG. 8 is a user interface provided on the display device for selecting PCB design files for input into the computing system, according to some embodiments.

FIG. 7 is a user interface 500 provided on a display device such as display device 1012, for allowing input into a computing system of PCB design files for processing to automatically generate a PCB and/or PCBA cost estimate. User interface 500 is presented using a web browser application, such as a Google Chrome, Apple Safari, Mozilla Firefox or another web browser application. User interface 500 includes an upload UI control 502 for enabling a user to add one or more PCB design files or a set of PCB design files by dragging a selected file or files from a folder using the UI of the computing system into UI control 502. In this embodiment, upload UI control 502 permits a user to alternatively select UI control 502 using a mouse or other input device to generate a dialog box for selecting a file or files, as shown in FIG. 8. FIG. 8 is a user interface 510 provided on the display device for selecting one or more PCB design files from a dialog box 512 for input into the computing system, according to some embodiments. A user may select from a number of listed files, such as "Gerber1.zip" shown highlighted in FIG. 8, and press "Open" to cause the selected file or files to be input into the computing system.

Figure 9:
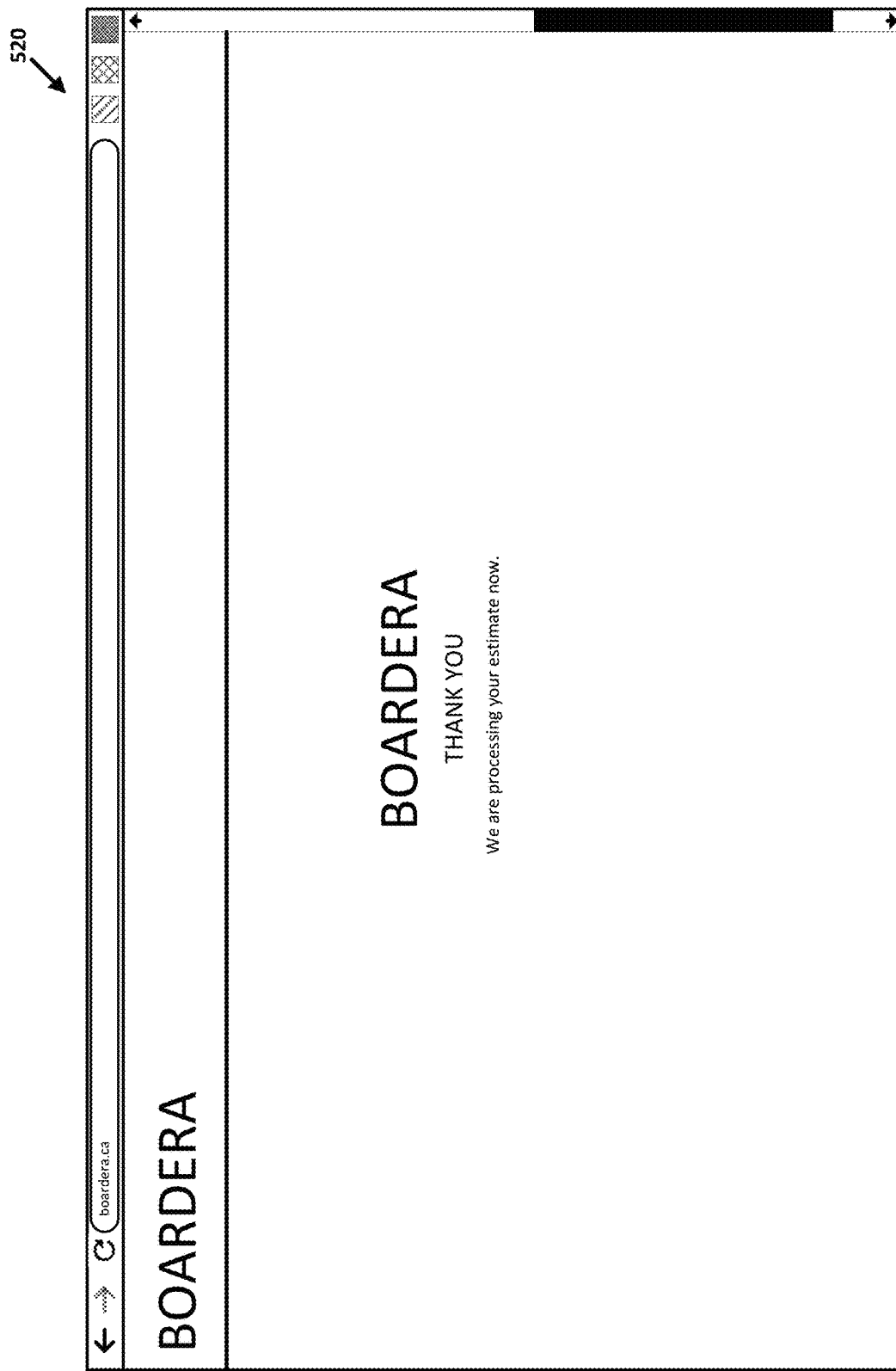
FIG. 9 is a user interface provided on the display device for confirming selected PCB design files are being processed for automatically generating the cost estimate, according to some embodiments.

FIG. 9 is a user interface 520 provided on the display device for confirming selected PCB design files are being processed for automatically generating the cost estimate, according to some embodiments.

Figure 10:
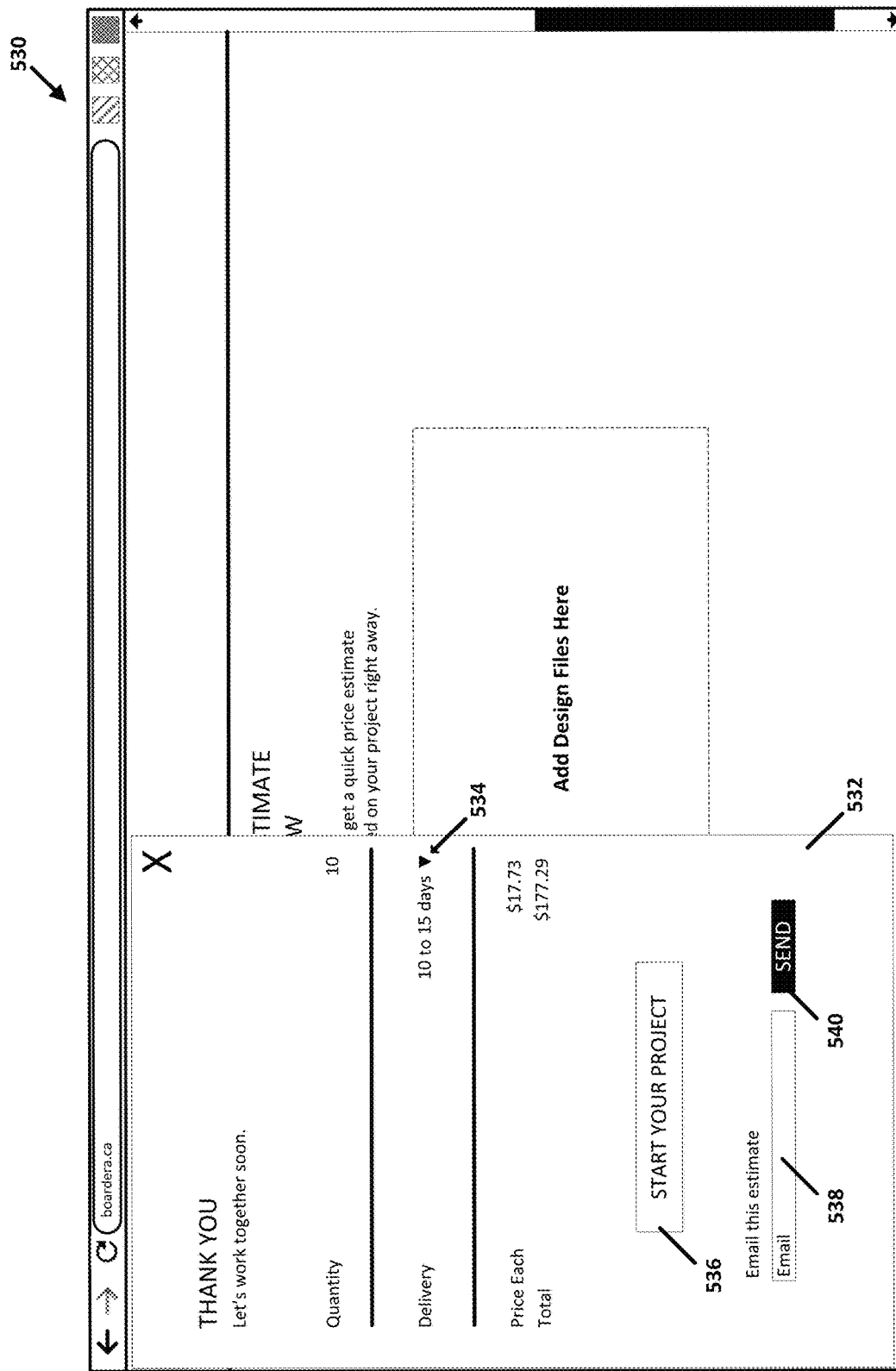
FIG. 10 is a user interface provided on the display device for displaying the automatically-generated cost estimate, according to some embodiments.

FIG. 10 is a user interface 540 provided on the display device for displaying the automatically generated cost estimate, according to some embodiments. Processes for automatically generating cost estimates using PCB design files are not within the scope of this application. However, generally features encoded in PCB design files, BOMs, drill files and the like are processed to determine the number and nature of the features, including sizes and complexities of features, and the components themselves including required assembly processes, in order to calculate pricing based on the processing and based on pricing made available for production by a manufacturer of the PCB and/or PCBA. User interface 540 includes an overlay 532 for providing pricing feedback including a number of units, a delivery time estimate, a price per PCB/PCBA, and a total price calculated based on the price per PCB/PCBA and the number of units. Overlay 532 includes a user interface control 534 for enabling a user to change the delivery time estimate, with a shorter time estimate generally resulting in a calculation of a higher price and a longer time estimate generally resulting in a calculation of a lower price. Overlay 532 also includes a Start Your Project button 536 for enabling a user to move from the cost estimate user interface 540 to a project user interface, as will be described. Overlay 532 also includes an Email this estimate text box 538 with corresponding send button 540 enabling a user to receive an email copy of the estimate set out in the overlay 532.

Figure 11:
FIG. 11 is a user interface provided on the display device for enabling a user to login or register to proceed with a project based on the inputted PCB design files, according to some embodiments.

FIG. 11 is a user interface 550 provided on the display device for enabling a user to login or register to proceed with a project based on the inputted PCB design files, according to some embodiments. User interface 550 includes a LOGIN section 552 enabling a user to submit the user's email address and password thereby to log in. User interface also includes a SIGN UP section 554 enabling a user to enter the user's first and last names, their email address, password, and phone number. SIGN UP section also includes a checkbox for enabling the user to agree to software Terms & Conditions, thereby to sign in. After signing in, the user may log in using the user's email address and chosen password.

Figure 12:
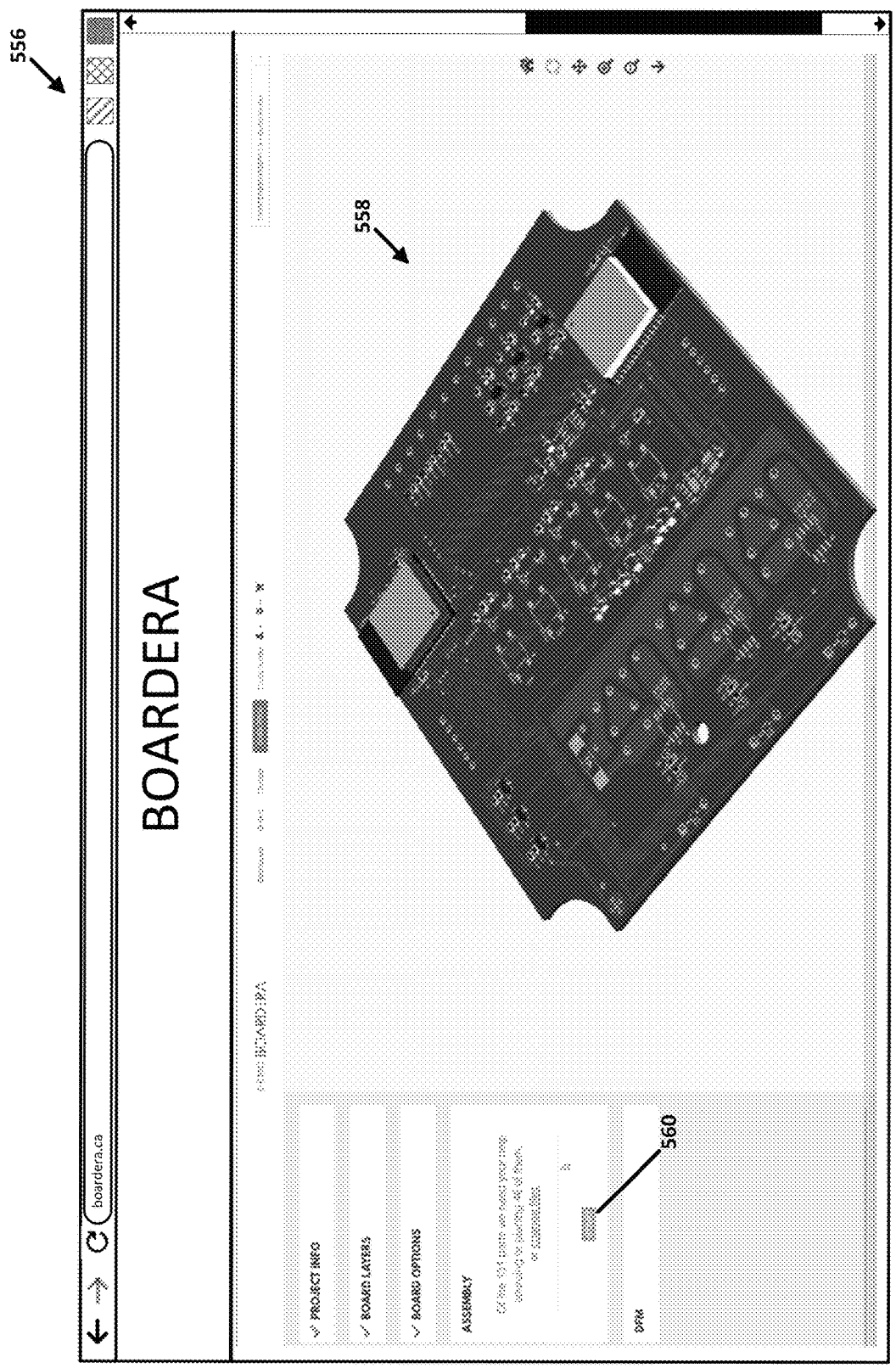
FIG. 12 is a user interface provided on the display device for graphically displaying an automatically-generated representation of PCB design features of the PCB design, according to some embodiments.

FIG. 12 is a user interface 556 provided on the display device for graphically displaying an automatically generated representation 558 of the PCB design, according to some embodiments. A user may be led through various stages to specify Project Information, Board Layers, Board Options, Assembly Information, and DFM (Design For Manufacturing) test results that may provide information to the user about manufacturability of the PCB design based on capabilities of manufacturing equipment and/or facilities. As shown in FIG. 12, the user has reached the Assembly Information stage, and is being informed that, of the 131 parts (i.e., electrical components), user interaction is being requested to source or place 46 of them. Determination as to which electrical components require user interaction to specify or disambiguate placement and/or orientation may be conducted as described herein.

User interface 556 includes a user interface control 560 for enabling a user to begin a process of component placement, according to some embodiments. A user may select a START button to signal approval. Responsive to the user selecting the START button, the user may be guided through a component placement process.

Figure 13:
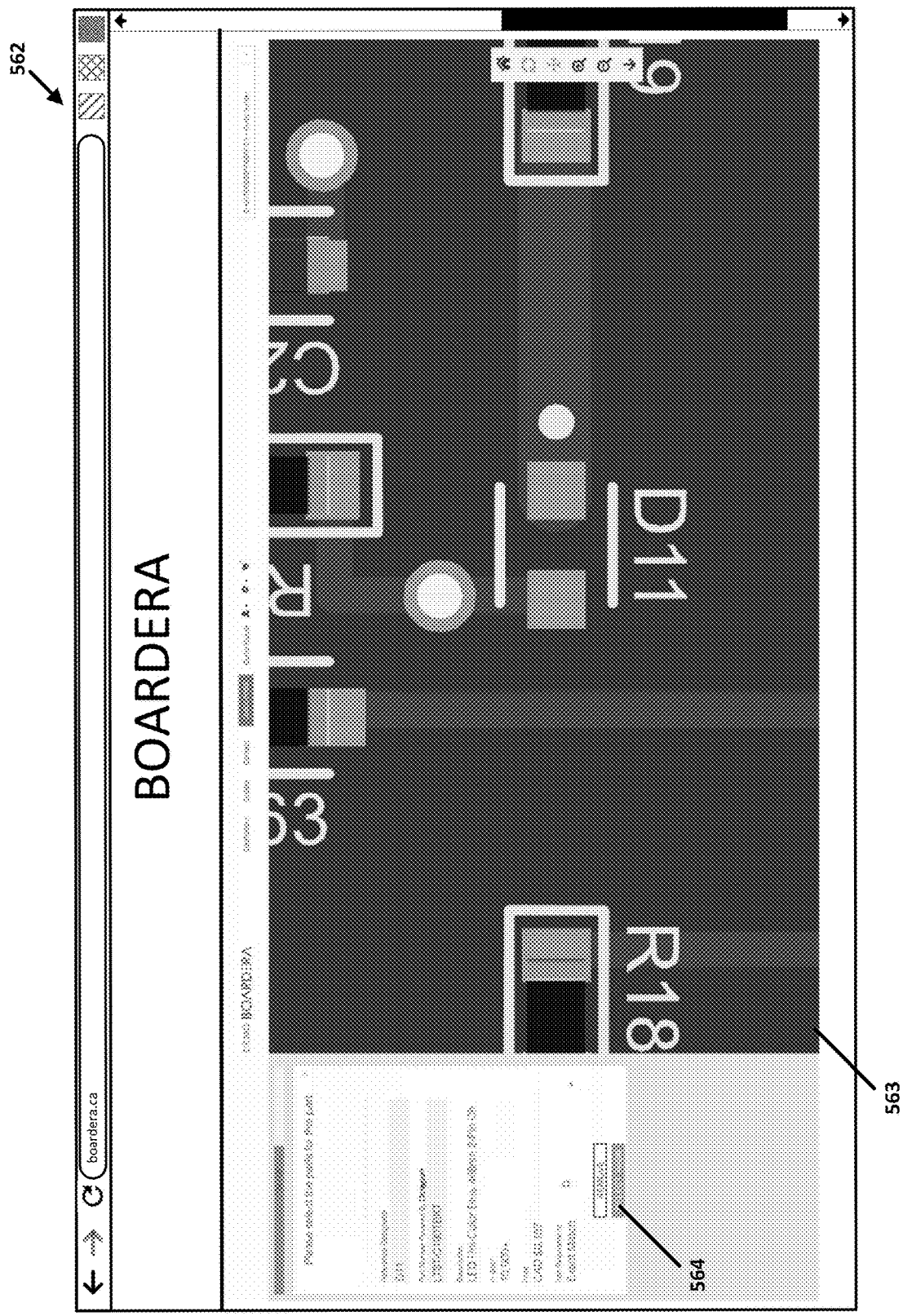
FIG. 13 is a user interface provided on the display device for designating one or more of the PCB design features as electrical contacts for a first selected electrical component.

FIG. 13 is a user interface 562 provided on the display device for designating one or more of the PCB design features as electrical contacts for a first selected electrical component. In this embodiment, the first selected electrical component is selected from a BOM design file of the PCB design file, and is a diode with reference designation (RD) D11. In this embodiment, a region 563 in which diode D11 may be intended to be placed is estimated based on first XYRS data in the PCB design files for diode D11. In this embodiment, region 563 is a rectangle centred at the X-Y position specified in the first XYRS data, having a length that is about six (6) times the length of a footprint of D11 and about six (6) times the height of the footprint of D11. The text "D11" is shown on the display device at a location and at an orientation specified in a silk screen PCB design file for instructing a silk screen process to deposit such text (encoded as draw/erase commands in the silk screen PCB design file) on the physical PCB during manufacturing. It will be appreciated that a diode is a two-lead component whose orientation matters to its operation. As such, a Pin1 (a first lead) of diode D11 should be associated with a particular one of the two electrical contacts with which diode D11 should be connected. A user interface control 564 is provided in association with specification information about diode D11, including its part number, a human-readable description, a stock level at a particular supplier, a price and denomination of the price, and an additional Parts Requirements section. User interface control 564 is titled "Select Pads" in this embodiment. When selected, user interface control 564 enables a user to proceed to designate electrical contact features displayed within the estimated region as electrical contact features for diode D11.

Figure 14:
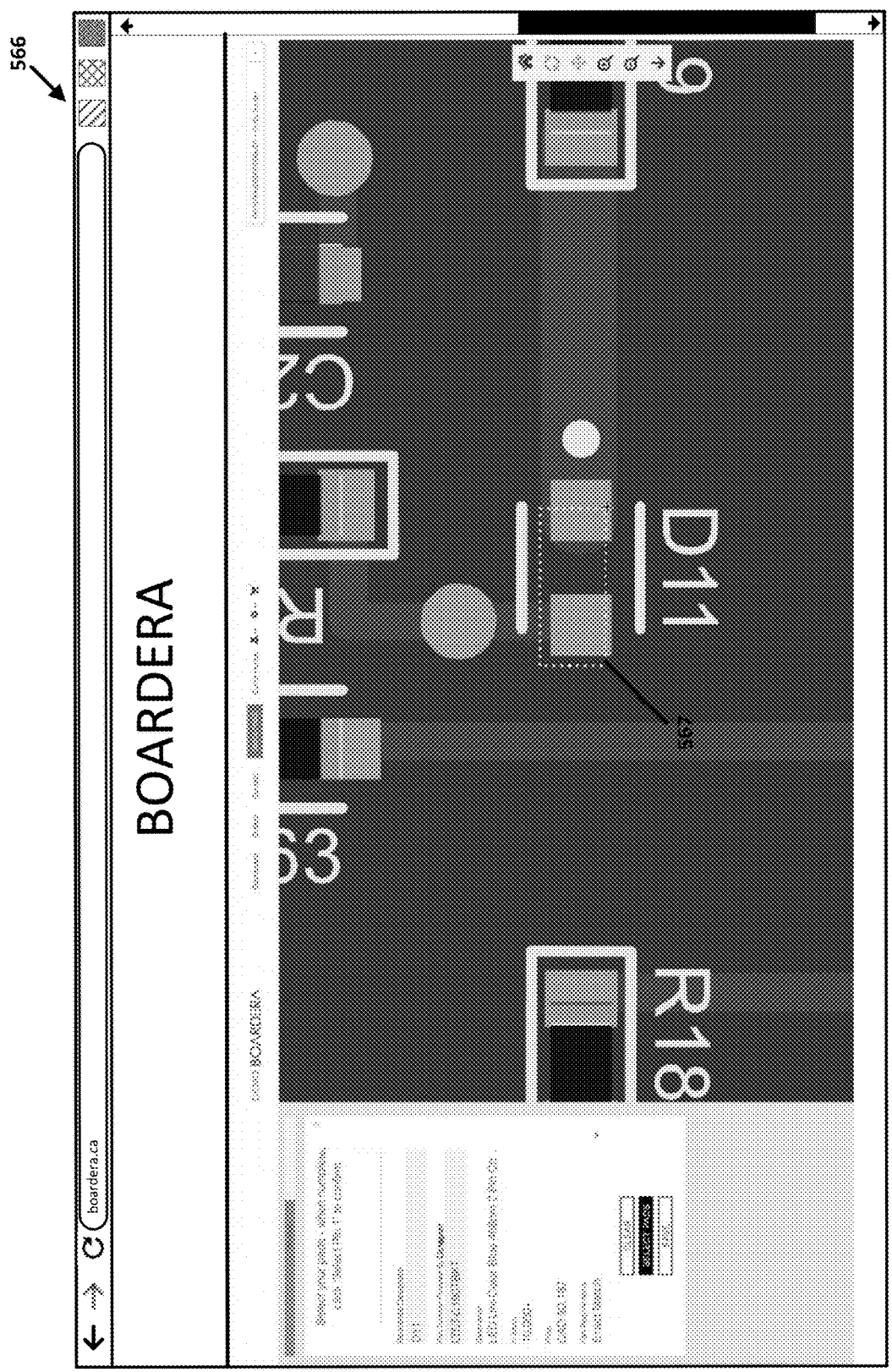
FIG. 14 is a user interface showing a user interface control being used to select, and thereby designate, two (2) PCB design features as electrical contacts for the first selected electrical component.

FIG. 14 is a user interface 566 showing a user interface control 567 being used to select, and thereby designate, two (2) PCB design features as electrical contacts for the first selected electrical component. In this embodiment, user interface control 567 is a draw tool that, when initiated on user interface 566, enables the user to specify a rectangle—displayed in broken lines—that intersects with electrical contact features of the graphically displayed PCB design. In this embodiment, user interface control 567 also enables individual selection of electrical contact features simply by mouse-clicking on electrical contact features and/or pressing CTRL or SHIFT on a keyboard and using the mouse to select more than one of the electrical contact features thereby to designate the electrical contact features as electrical contacts for D11 in particular.

Figure 15:
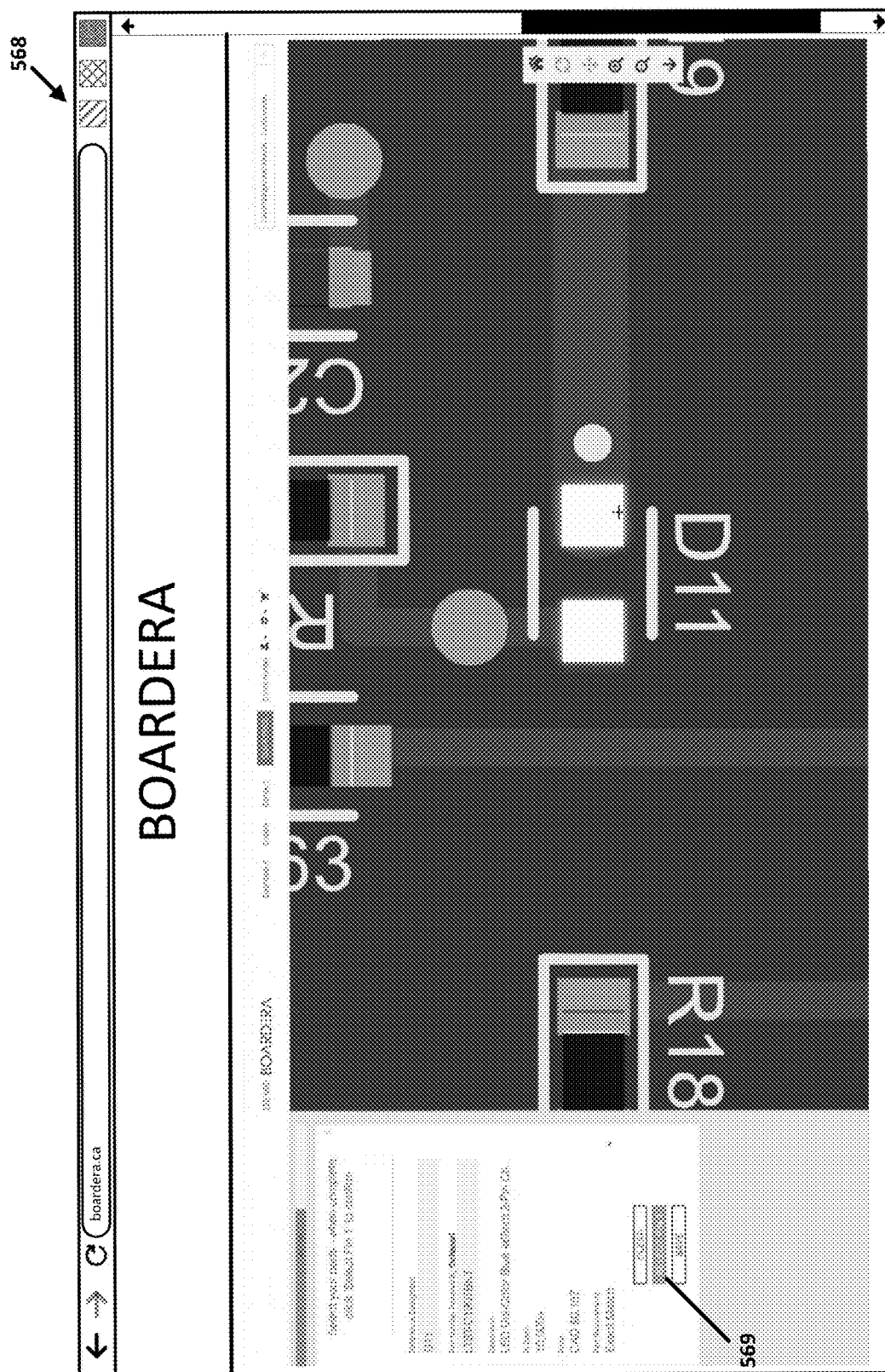
FIG. 15 shows the user interface control of FIG. 13 after the two PCB design features have been designated as electrical contacts for the first selected electrical component.

FIG. 15 is a user interface 568 showing the two PCB design features having been selected and thereby designated as electrical contacts for D11. The two PCB design features—the electrical contacts for D11—are shown as graphically distinct from other PCB design features currently being displayed by being displayed in a noticeably brighter colour. A user interface control 569 titled "Select Pin1" enables a user to begin a process of selecting from the two designated electrical contacts for D11 which one is to be associated with the first electrical lead (i.e., Pin1) of D11.

Figure 16:
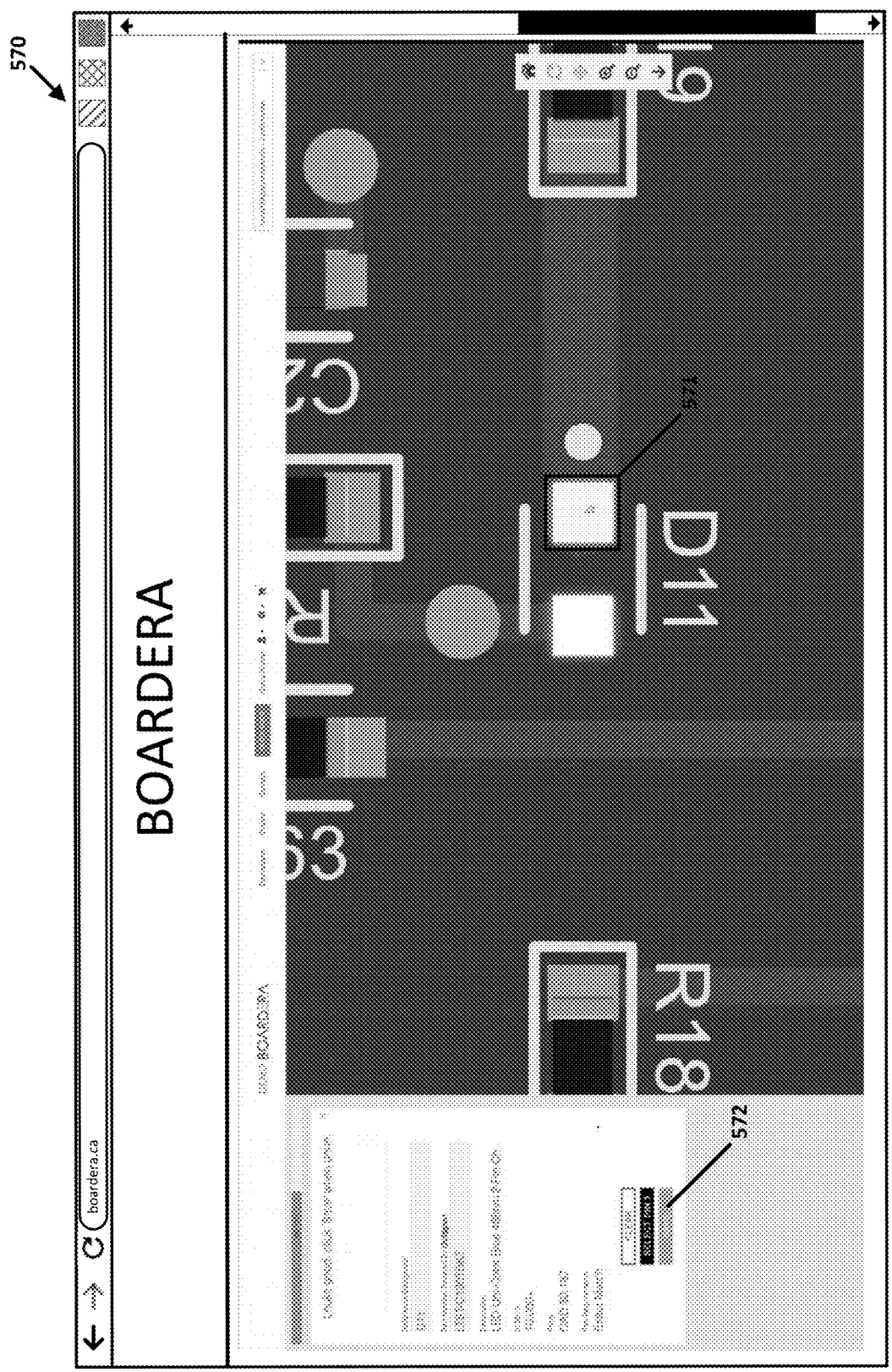
FIG. 16 shows the user interface control of FIG. 13 after one (1) of the two PCB design features designated as electrical contacts for the first selected electrical component has been associated with a first electrical lead of the first selected electrical component.

FIG. 16 is a user interface 570 showing a user interface control 571 after one (1) of the two PCB design features designated as electrical contacts for diode D11 has been associated with Pin1 of diode D11. The associated electrical contact is shown as graphically distinct from the other electrical contact by being encompassed within a darkened border. Both of the designated electrical contacts remain shown as graphically distinct from other PCB design features currently being displayed by being displayed in the noticeably brighter colour. A user interface control 572 is provided for enabling a user to save the above-described designations and the association.

With PCB design features having been designated as electrical contacts for diode D11, and with one of the electrical contacts having been associated with Pin1 of diode D11, second XYRS data for diode D11 may be automatically generated as described herein and, in some embodiments, may replace the first XYRS data for diode D11.

Figure 17:
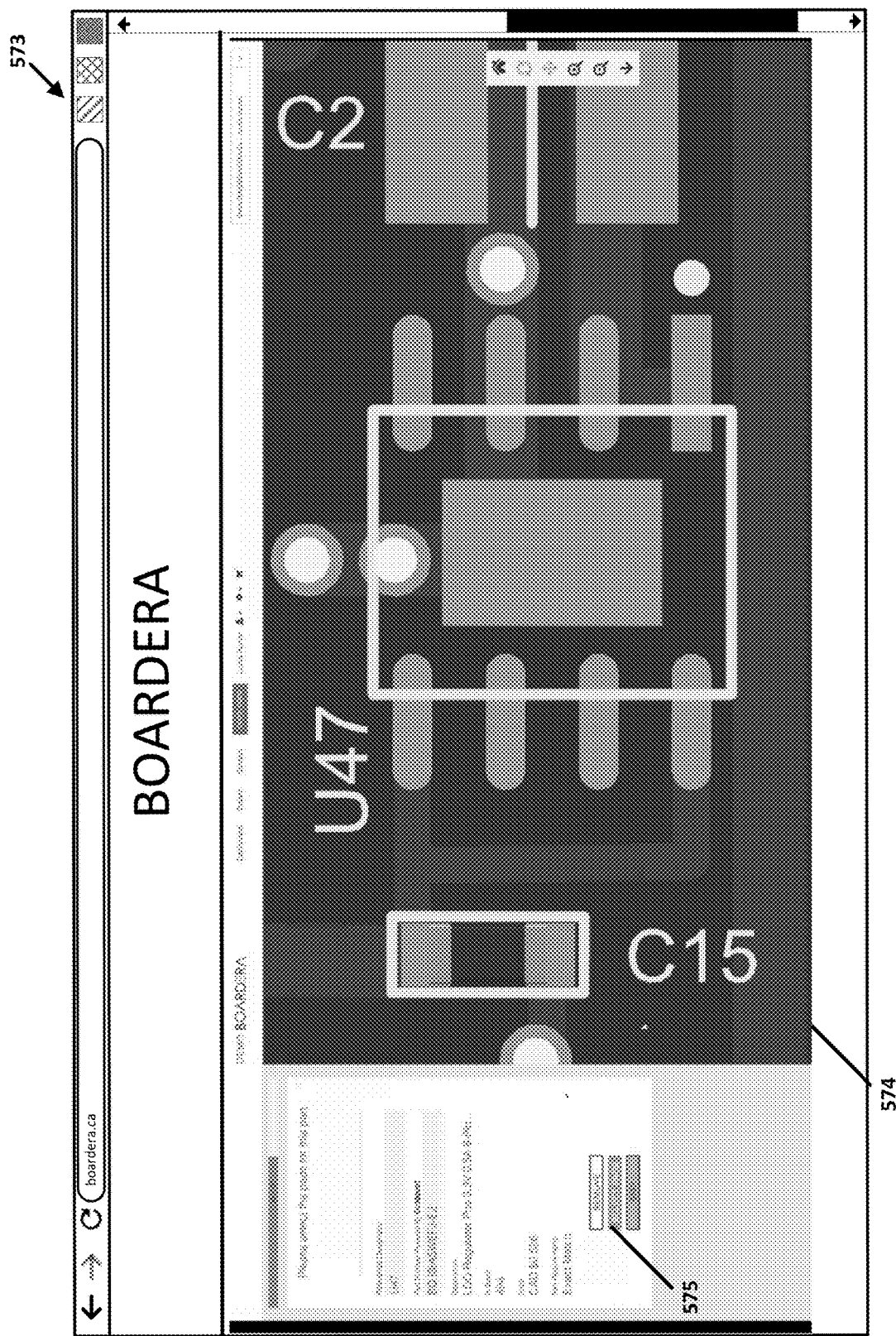
FIG. 17 is a user interface provided on the display device for designating one or more of the PCB design features as electrical contacts for a second selected electrical component.

FIG. 17 is a user interface 573 provided on the display device for designating one or more of the PCB design features as electrical contacts for a second selected electrical component. In this embodiment, the second selected electrical component is selected from a BOM design file of the PCB design file, and is an integrated circuit (IC) with reference designation (RD) U47. In this embodiment, a region 574 in which IC U47 may be intended to be placed is estimated based on first XYRS data in the PCB design files for IC U47. In this embodiment, region 574 is a rectangle centred at the X-Y position specified in the first XYRS data, having a length that is about three (3) times the length of a footprint of IC U47 and about 1.5 times the height of the footprint of U47. It will be appreciated that what zoom level may be shown in a user interface may be determined using different logic from that used to determine the region within which a component may be intended to be placed. For this reason, and/or for one or more other reasons, the zoom level may cause a display device to display more or less than the region itself. The text "U47" is shown on the display device at a location and at an orientation specified in a silk screen PCB design file for instructing a silk screen process to deposit such text (encoded as draw/erase commands in the silk screen PCB design file) on the physical PCB during manufacturing. It will be appreciated that this IC U47 is a nine-lead component whose orientation matters to its operation. As such, a Pin1 (a first lead) of IC U47 should be associated with a particular one of the nine electrical contacts with which IC U47 should be connected. A user interface control 575 is provided in association with specification information about IC U47, including its part number, a human-readable description, a stock level at a particular supplier, a price and denomination of the price, and an additional Parts Requirements section. User interface control 575 is titled "Select Pads" in this embodiment. When selected, user interface control 575 enables a user to proceed to designate electrical contact features displayed within the estimated region as electrical contact features for IC U47.

Selection of electrical contact features to be designated as electrical contacts for IC U47 may be done by a user in a similar manner as has been described herein in connection with the selection of electrical contact features to be designated as electrical contacts for diode D11.

Figure 18:
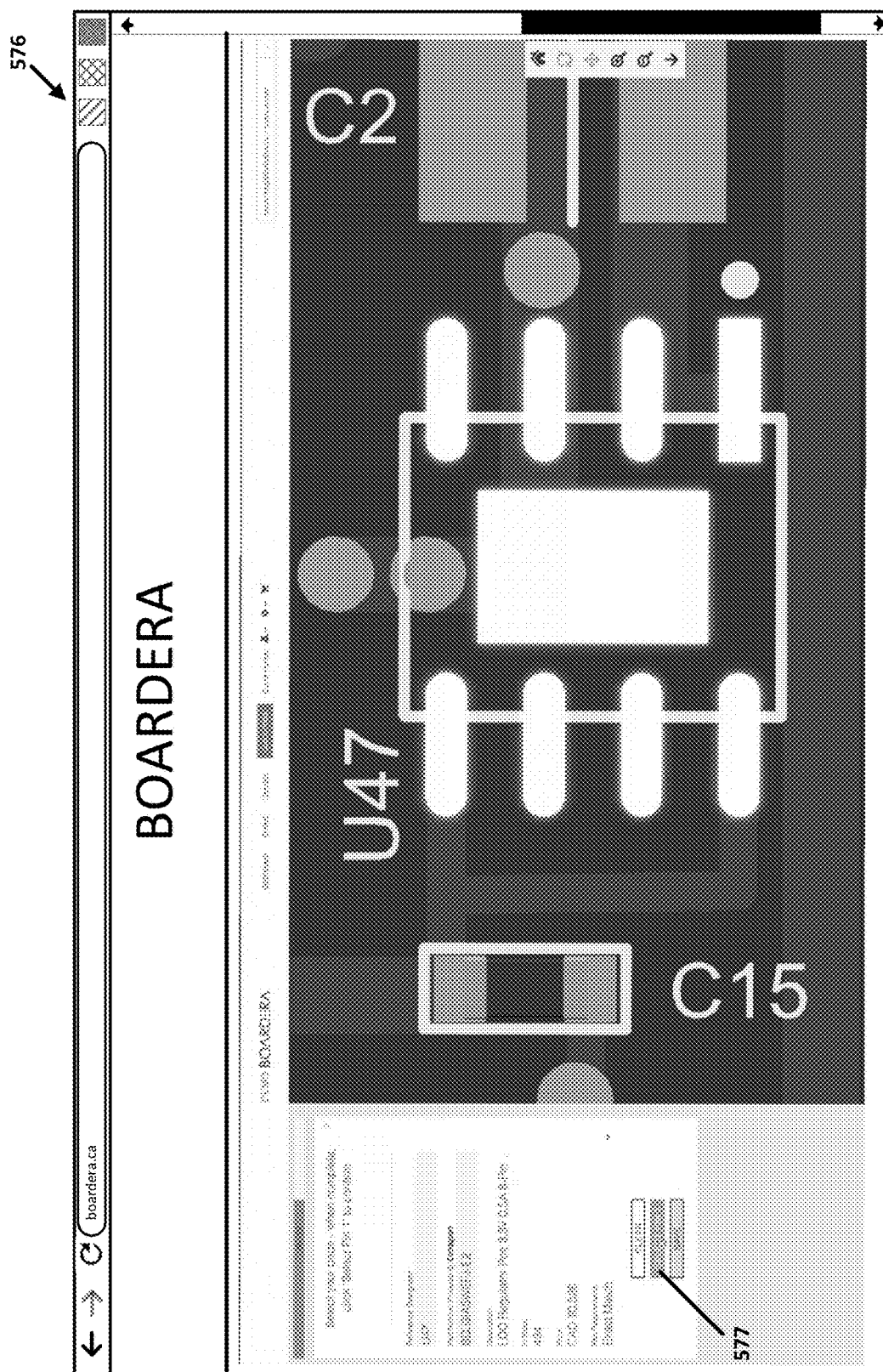
FIG. 18 shows the user interface control of FIG. 17 after nine (9) PCB design features have been designated as electrical contacts for the second selected electrical component.

FIG. 18 is a user interface 576 showing the nine (9) PCB design features having been selected and thereby designated as electrical contacts for IC U47. The nine PCB design features—the electrical contacts for IC U47—are shown as graphically distinct from other PCB design features currently being displayed by being displayed in a noticeably brighter colour. A user interface control 577 titled "Select Pin1" enables a user to begin a process of selecting from the nine designated electrical contacts for IC U47 which one is to be associated with the first electrical lead (i.e., Pin1) of IC U47.

Figure 19:
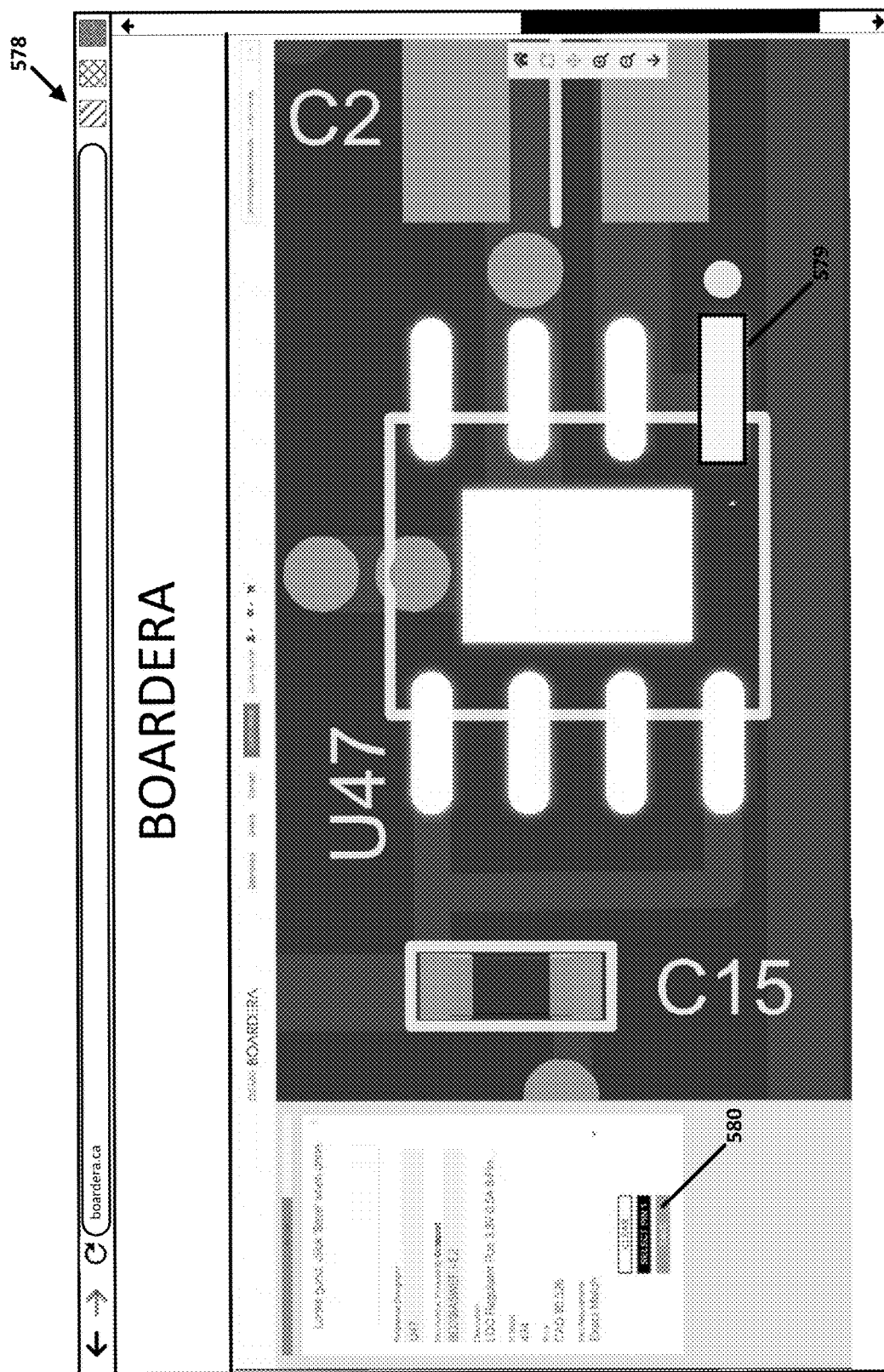
FIG. 19 shows the user interface control of FIG. 17 after one (1) of the nine PCB design features designated as electrical contacts for the second selected electrical component has been associated with a first electrical lead of the second selected electrical component.

FIG. 19 is a user interface 578 showing a user interface control 579 after one (1) of the two PCB design features designated as electrical contacts for IC U47 has been associated with Pin1 of IC U47. The associated electrical contact is shown as graphically distinct from the other electrical contact by being encompassed within a darkened border. All of the designated electrical contacts remain shown as graphically distinct from other PCB design features currently being displayed by being displayed in the noticeably brighter colour. A user interface control 580 is provided for enabling a user to save the above-described designations and the association.

With PCB design features having been designated as electrical contacts for IC U47, and with one of the electrical contacts having been associated with Pin1 of IC U47, second XYRS data for IC U47 may be automatically generated as described herein and, in some embodiments, may replace the first XYRS data for IC U47.

The present disclosure contemplates the use of user interactions and the use of features of PCB designs with which the user interactions may be associated to train a machine learning model to predict PCB design aspects such as location/orientation of electrical components in a given PCB design, and/or specification of attributes of an electrical component given an identifier. Such a machine-learning model may be useful for simplifying design and/or modification of a PCB design for a subsequent user.

Figure 20:
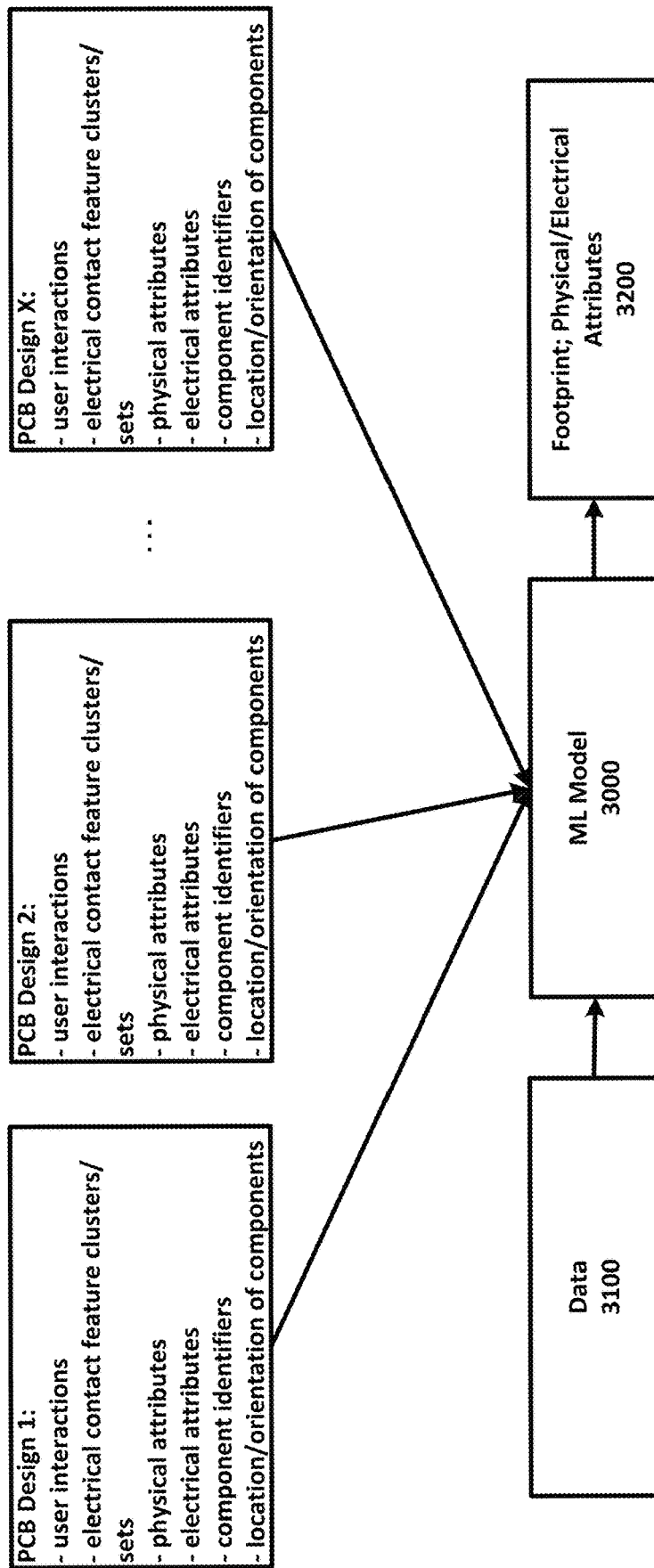
FIG. 20 is an example block diagram of training a machine learning model to output a footprint and/or specification of electrical/physical attributes of an electrical component given an identifier of the electrical component.

FIG. 20 shows an example block diagram of training a machine learning model 3000 to output, based on data 3100 pertaining to an identifier of an electrical component, footprint and/or physical/electrical attributes data 3200 for the electrical component, according to the present disclosure. Data pertaining to other PCB designs and/or users' interactions with PCB designs via user interfaces to specify, add to, correct or otherwise interact with the PCB designs may be received by a server. The other PCB designs may each have included clusters or sets of electrical contact features that a respective user had associated, either expressly or as part of a contact selection process or in some other manner involving the user, with the identifier of the electrical component. The clusters or sets of electrical contact features may each further have included a respective electrical contact feature that a user had designated as to be associated with a first electrical lead of the electrical component that is associated with the cluster or set. Other inputs in association with the identifier and/or with the clusters regarding the physical and/or electrical attributes of an electrical component may have been received. The data pertaining to other PCB designs may therefore include attributes of the other PCB designs such as clusters of electrical contact features associated with a single electrical component, an indication of an electrical contact feature in such clusters to be associated with a first electrical lead of an electrical component, identifiers of such an electrical component, other physical and/or electrical attributes of the electrical component etc.

The data pertaining to other PCB designs and/or users' interactions with the PCB designs may be included in a training dataset used to train the machine-learning model 3000. For example, the machine-learning model 3000 may be trained to match a pattern between electrical contacts features in various clusters in various PCB designs associated with an identifier of an electrical component, and to output a footprint and/or other physical data pertaining to the electrical component. Such an output may thereafter be used—by a user or automatically during a subsequent PCB design process—to position and orient another one of the same electrical components with respect to a PCB design. This may be useful in the event that a physical and/or electrical specification of a particular electrical component is not available in a previously fixed format from a component database. Such a specification may be "built up" by training data resulting from users' interactions with various PCB designs via a user interface as they enabled electrical contact features and other PCB design elements to accommodate/ receive the electrical component. Such a specification of attributes may thereafter be available for retrieval using the identifier by a subsequent user during creation/modification of their own PCB design as though the specification had been explicitly specified in a component database.

Figure 21:
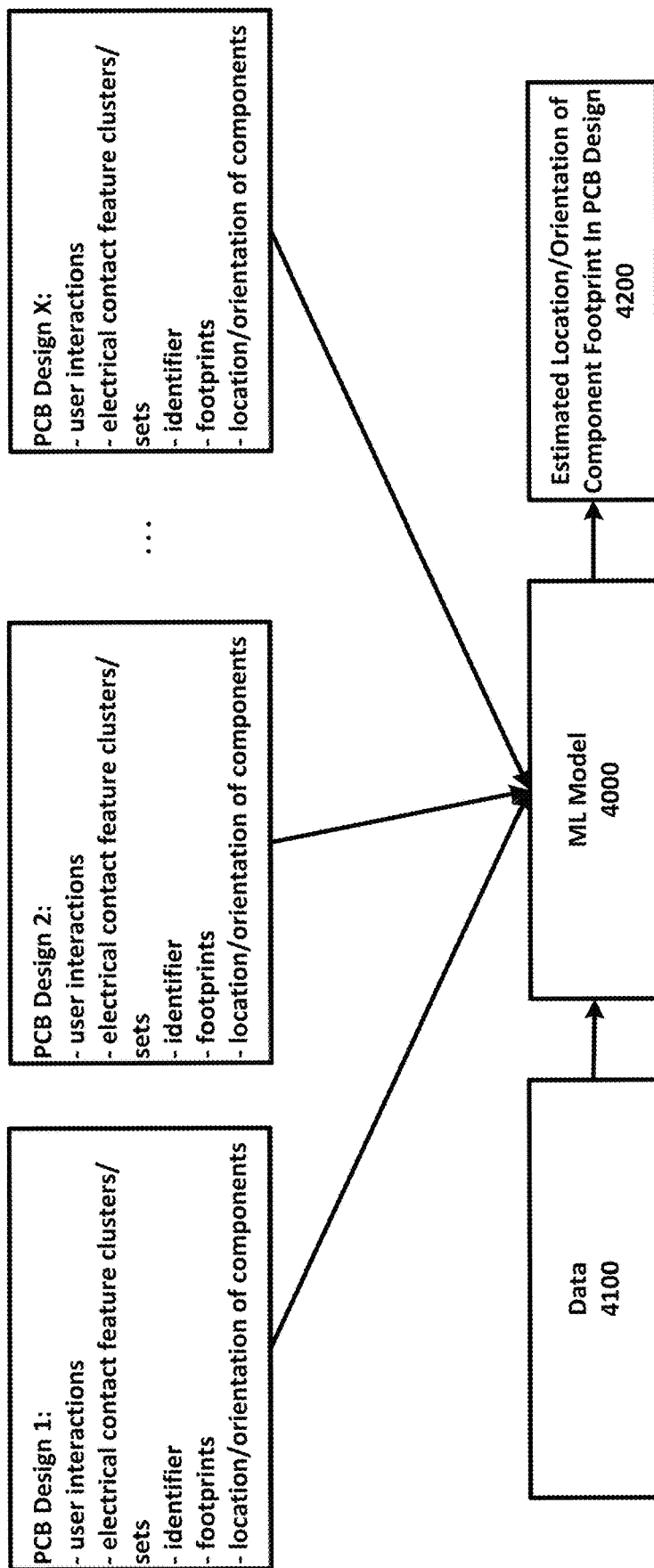
FIG. 21 is an example block diagram of training a machine-learning model to output location and/or orientation of a footprint of an electrical component in a PCB design given an identifier of the electrical component and PCB design feature data.

FIG. 21 shows an example block diagram of training a machine learning model 4000 to output, based on data 4100 pertaining to an identifier of an electrical component and data pertaining to electrical contact features of a PCB design, estimated location and orientation data 4200 for the electrical component in the PCB design, according to the present disclosure. Data pertaining to other PCB designs and/or users' interactions with PCB designs via user interfaces to specify, add to, correct or otherwise interact with the PCB designs may be received by a server. The other PCB designs may each have included clusters or sets of electrical contact features that a respective user had associated, either expressly or as part of a contact selection process or in some other manner involving the user, with a footprint of the electrical component. The clusters or sets of electrical contact features may each further have included a respective electrical contact feature that a user had designated as to be associated with a first electrical lead of the electrical component that is associated with the cluster or set. The data pertaining to other PCB designs may therefore include attributes of the other PCB designs such as clusters of electrical contact features associated with a single electrical component, an indication of an electrical contact feature in such clusters to be associated with a first electrical lead of an electrical component, identifiers of such an electrical component, position and/or orientation of the footprint with respect to the electrical contact features, etc.

The data pertaining to other PCB designs and/or users' interactions with the PCB designs may be included in a training dataset used to train the machine-learning model 4000. For example, the machine-learning model 4000 may be trained to match a pattern between electrical contacts features in various clusters in various PCB designs associated with an electrical component and a footprint of the electrical component, and to output location and/or orientation for the footprint with respect to the electrical contact features. Such an output may thereafter be used to automatically position and orient another one of the same electrical components with respect to a PCB design. This may be useful for automatically specifying and/or correcting the position/orientation of the electrical component thereby to reduce an amount of interaction required by a subsequent user who has specified the electrical component as part of the PCB design. Such a position and/or orientation may be predicted as a result of training using training data resulting from users' interactions with various PCB designs via a user interface as they associated a footprint of the electrical component with electrical contact features and other PCB design elements to accommodate/receive the electrical component.

CLAUSES

1. A method for printed circuit board (PCB) component placement comprising: graphically displaying, on a display device, PCB design features of a PCB design; and providing a user interface control for designating one or more of the PCB design features as electrical contacts for a first selected electrical component.

2. The method of clause 1, comprising: receiving first XYRS data for the first selected electrical component prior to graphically displaying, on the display device, the PCB design features of the PCB design; and automatically generating, based at least on the designating, second XYRS data for the first selected electrical component.

3. The method of clause 2, comprising: replacing the first XYRS data for the first selected electrical component with the second XYRS data for the first selected electrical component.

4. The method of clause 2, wherein automatically generating the second XYRS data for the first selected electrical component comprises: based at least on relationships between X-Y positions of PCB design features designated as electrical contacts for the first selected electrical component with respect to an X axis and a Y axis of the PCB design, defining a placement area for the first selected electrical component; and determining an X-Y position and an orientation for a footprint of the first selected electrical component that would cause the footprint to register with the placement area, wherein the second XYRS data for the first selected electrical component is generated based on the determined X-Y position and orientation of the footprint.

5. The method of clause 4, comprising: prior to automatically generating the second XYRS data, providing a user interface control for associating a PCB design feature with a first electrical lead of the first selected electrical component.

6. The method of clause 5, comprising: requiring, in respect of the first selected electrical component, a user to engage with the user interface control for designating prior to permitting the user to engage with the user interface control for associating.

7. The method of clause 6, wherein the user interface control for associating permits associating with the first electrical lead of the first selected electrical component only one of the PCB design features designated, using the user interface control for designating, as electrical contacts for the first selected electrical component.

8. The method of clause 5, wherein the determined X-Y position and orientation for the footprint of the first selected electrical component would also cause the PCB design feature associated with the first electrical lead of the first selected electrical component to register with a portion of the footprint that corresponds to the first electrical lead.

9. The method of clause 2, comprising: receiving one or more electronic PCB design files defining the PCB design, wherein the one or more electronic PCB design files include the first XYRS data.

10. The method of clause 9, comprising: prior to graphically displaying, on the display device, the PCB design features of the PCB design, processing at least the first XYRS data to estimate a region of the PCB design in which the first selected electrical component is to be placed, wherein graphically displaying PCB design features of the PCB design comprises zooming in on a subset of the PCB design features of the PCB design that are located in the estimated region.

11. The method of clause 2, comprising: calculating a first offset between the first XYRS data and the second XYRS data; providing a user interface control for designating one or more of the PCB design features as electrical contacts for a second selected electrical component; receiving third XYRS data for the second selected electrical component prior to graphically displaying, on the display device, the PCB design features of the PCB design; and automatically generating, based at least on the designating, fourth XYRS data for the second selected electrical component; calculating a second offset between the third XYRS data and the fourth XYRS data; and responsive to the first offset matching with the second offset: providing a user interface option to automatically generate additional XYRS data for each of at least one additional component based on the first offset.

12. A system for printed circuit board (PCB) component placement comprising: a user interface provided on a display device for graphically displaying PCB design features of a PCB design; and a user interface control for designating one or more of the PCB design features as electrical contacts for a first selected electrical component.

13. The system of clause 12, comprising: a user interface for receiving first XYRS data for the first selected electrical component; and an XYRS generator for automatically generating, based at least on the designating, second XYRS data for the first selected electrical component.

14. The system of clause 13, wherein the first XYRS data for the first selected electrical component is replaced with the second XYRS data for the first selected electrical component.

15. The system of clause 13, wherein the XYRS generator automatically generates the second XYRS data for the first selected electrical component by: based at least on relationships between X-Y positions of PCB design features designated as electrical contacts for the first selected electrical component with respect to an X axis and a Y axis of the PCB design, defining a placement area for the first selected electrical component; and determining an X-Y position and an orientation for a footprint of the first selected electrical component that would cause the footprint to register with the placement area, wherein the second XYRS data for the first selected electrical component is generated based on the determined X-Y position and orientation of the footprint.

16. The system of clause 15, comprising: a user interface control for associating a PCB design feature with a first electrical lead of the first selected electrical component.

17. The system of clause 16, wherein a user is required, in respect of the first selected electrical component, to engage with the user interface control for designating prior to engaging with the user interface control for associating.

18. The system of clause 17, wherein the user interface control for associating permits associating with the first electrical lead of the first selected electrical component only one of the PCB design features designated, using the user interface control for designating, as electrical contacts for the first selected electrical component.

19. The system of clause 16, wherein the determined X-Y position and orientation for the footprint of the first selected electrical component would also cause the PCB design feature associated with the first electrical lead of the first selected electrical component to register with a portion of the footprint that corresponds to the first electrical lead.

20. The system of clause 13, comprising: a user interface for receiving one or more electronic PCB design files defining the PCB design, wherein the one or more electronic PCB design files include the first XYRS data.

21. The system of clause 20, comprising: a region estimator for, prior to graphically displaying, on the display device, the PCB design features of the PCB design, processing at least the first XYRS data to estimate a region of the PCB design in which the first selected electrical component is to be placed, wherein the user interface for graphically displaying PCB design features of the PCB design zooms in on a subset of the PCB design features of the PCB design that are located in the estimated region.

22. The system of clause 13, comprising: a user interface option to automatically generate additional XYRS data for each of at least one additional component based on an offset between the first XYRS data for the first selected electrical component and the second XYRS data for the first selected electrical component.

23. A non-transitory computer readable medium embodying a computer program executable on at least one processor for printed circuit board (PCB) component placement, the computer program comprising: computer program code for graphically displaying, on a display device, PCB design features of a PCB design; and computer program code for providing a user interface control for designating one or more of the PCB design features as electrical contacts for a first selected electrical component.

24. The non-transitory computer readable medium of clause 23, the computer program comprising: computer program code for receiving first XYRS data for the first selected electrical component prior to graphically displaying, on the display device, the PCB design features of the PCB design; and computer program code for automatically generating, based at least on the designating, second XYRS data for the first selected electrical component.

25. The non-transitory computer readable medium of clause 24, the computer program comprising: computer program code for replacing the first XYRS data for the first selected electrical component with the second XYRS data for the first selected electrical component.

26. The non-transitory computer readable medium of clause 24, wherein computer program code for automatically generating the second XYRS data for the first selected electrical component comprises: computer program code for based at least on relationships between X-Y positions of PCB design features designated as electrical contacts for the first selected electrical component with respect to an X axis and a Y axis of the PCB design, defining a placement area for the first selected electrical component; and computer program code for determining an X-Y position and an orientation for a footprint of the first selected electrical component that would cause the footprint to register with the placement area, wherein the second XYRS data for the first selected electrical component is generated based on the determined X-Y position and orientation of the footprint.

27. The non-transitory computer readable medium of clause 26, the computer program comprising: computer program code for prior to automatically generating the second XYRS data, providing a user interface control for associating a PCB design feature with a first electrical lead of the first selected electrical component.

28. The non-transitory computer readable medium of clause 27, the computer program comprising: computer program code for requiring, in respect of the first selected electrical component, a user to engage with the user interface control for designating prior to permitting the user to engage with the user interface control for associating.

29. The non-transitory computer readable medium of clause 28, wherein the user interface control for associating permits associating with the first electrical lead of the first selected electrical component only one of the PCB design features designated, using the user interface control for designating, as electrical contacts for the first selected electrical component.

30. The non-transitory computer readable medium of clause 27, wherein the determined X-Y position and orientation for the footprint of the first selected electrical component would also cause the PCB design feature associated with the first electrical lead of the first selected electrical component to register with a portion of the footprint that corresponds to the first electrical lead.

31. The non-transitory computer readable medium of clause 24, the computer program comprising: computer program code for receiving one or more electronic PCB design files defining the PCB design, wherein the one or more electronic PCB design files include the first XYRS data.

32. The non-transitory computer readable medium of clause 31, the computer program comprising: computer program code for prior to graphically displaying, on the display device, the PCB design features of the PCB design, processing at least the first XYRS data to estimate a region of the PCB design in which the first selected electrical component is to be placed, wherein graphically displaying PCB design features of the PCB design comprises zooming in on a subset of the PCB design features of the PCB design that are located in the estimated region.

33. The non-transitory computer readable medium of clause 24, the computer program comprising: computer program code for calculating a first offset between the first XYRS data and the second XYRS data; computer program code for providing a user interface control for designating one or more of the PCB design features as electrical contacts for a second selected electrical component; computer program code for receiving third XYRS data for the second selected electrical component prior to graphically displaying, on the display device, the PCB design features of the PCB design; and computer program code for automatically generating, based at least on the designating, fourth XYRS data for the second selected electrical component; computer program code for calculating a second offset between the third XYRS data and the fourth XYRS data; and computer program code for responsive to the first offset matching with the second offset: providing a user interface option to automatically generate additional XYRS data for each of at least one additional component based on the first offset.

34. A method for printed circuit board (PCB) component placement comprising: receiving one or more electronic PCB design files defining a PCB design; processing the one or more electronic PCB design files to determine which PCB design features of the PCB design are electrical contact features; graphically displaying, on a display device, at least a portion of the PCB design including a plurality of the determined electrical contact features; providing a user interface control for designating at least one displayed electrical contact feature as an electrical contact for a selected electrical component.

35. The method of clause 34, wherein the user interface control for designating at least one displayed electrical contact feature as an electrical contact for a selected electrical component displays each designated electrical contact feature as graphically distinct from undesignated electrical contact features.

36. The method of clause 34, wherein processing the one or more electronic PCB design files to determine which PCB design features are electrical contact features comprises: converting conductive and mask draw commands in the PCB design files to combined conductive polygons and combined mask polygons, wherein the converting comprises: converting each of the mask draw commands into individual mask polygons; combining individual mask polygons to form the combined mask polygons; converting into individual conductive polygons only conductive draw commands that are: entirely contained within a corresponding opening in a combined mask polygon; or intersecting a corresponding opening in a combined mask polygon; and combining the individual conductive polygons to form combined conductive polygons, determining as electrical contact features only combined conductive polygons that are entirely contained within a corresponding opening in a combined mask polygon.

37. A system for printed circuit board (PCB) component placement comprising: a user interface provided on a display device for receiving one or more electronic PCB design files defining a PCB design; a contact process for processing the one or more electronic PCB design files to determine which PCB design features of the PCB design are electrical contact features; a user interface provided on the display device for graphically displaying at least a portion of the PCB design including a plurality of the determined electrical contact features; and a user interface control for designating at least one displayed electrical contact feature as an electrical contact for a selected electrical component.

38. The system of clause 37, wherein the user interface control for designating at least one displayed electrical contact feature as an electrical contact for a selected electrical component displays each designated electrical contact feature as graphically distinct from undesignated electrical contact features.

39. The system of clause 37, wherein the contact process processes the one or more electronic PCB design files to determine which PCB design features are electrical contact features by: converting conductive and mask draw commands in the PCB design files to combined conductive polygons and combined mask polygons, wherein the converting comprises: converting each of the mask draw commands into individual mask polygons; combining individual mask polygons to form the combined mask polygons; converting into individual conductive polygons only conductive draw commands that are: entirely contained within a corresponding opening in a combined mask polygon; or intersecting a corresponding opening in a combined mask polygon; and combining the individual conductive polygons to form combined conductive polygons, determining as electrical contact features only combined conductive polygons that are entirely contained within a corresponding opening in a combined mask polygon.

40. A non-transitory computer readable medium embodying a computer program executable on at least one processor for printed circuit board (PCB) component placement, the computer program comprising: computer program code for receiving one or more electronic PCB design files defining a PCB design; computer program code for processing the one or more electronic PCB design files to determine which PCB design features of the PCB design are electrical contact features; computer program code for graphically displaying, on a display device, at least a portion of the PCB design including a plurality of the determined electrical contact features; and computer program code for providing a user interface control for designating at least one displayed electrical contact feature as an electrical contact for a selected electrical component.

41. The non-transitory computer readable medium of clause 40, wherein the user interface control for designating at least one displayed electrical contact feature as an electrical contact for a selected electrical component displays each designated electrical contact feature as graphically distinct from undesignated electrical contact features.

42. The non-transitory computer readable medium of clause 40, wherein the computer program code for processing the one or more electronic PCB design files to determine which PCB design features are electrical contact features comprises: computer program code for converting conductive and mask draw commands in the PCB design files to combined conductive polygons and combined mask polygons, wherein the computer program code for converting comprises: computer program code for converting each of the mask draw commands into individual mask polygons; computer program code for combining individual mask polygons to form the combined mask polygons; computer program code for converting into individual conductive polygons only conductive draw commands that are: entirely contained within a corresponding opening in a combined mask polygon; or intersecting a corresponding opening in a combined mask polygon; computer program code for combining the individual conductive polygons to form combined conductive polygons; and computer program code for determining as electrical contact features only combined conductive polygons that are entirely contained within a corresponding opening in a combined mask polygon.

43. A method for printed circuit board (PCB) component placement comprising: receiving one or more electronic PCB design files defining a PCB design; processing the one or more electronic PCB design files to determine which PCB design features of the PCB design are electrical contact features; processing electrical contact features to determine a subset of the electrical contact features that could together register with a footprint of a first electrical component; determining an X-Y position and an orientation for the footprint that would cause the footprint to register with the subset of the electrical contact features; and generating XYRS data for the first electrical component based on the determined X-Y position and orientation of the footprint.

44. The method of clause 43, comprising: prior to automatically generating the XYRS data, providing a user interface control for associating an electrical contact feature in the subset of the electrical contact features with a first electrical lead of the first electrical component.

45. The method of clause 44, wherein the determined X-Y position and orientation for the footprint of the first electrical component would also cause the electrical contact feature associated with the first electrical lead of the first electrical component to register with a portion of the footprint that corresponds to the first electrical lead.

46. The method of clause 43, comprising: processing the one or more electronic PCB design files to estimate a region of the PCB design in which the first electrical component is to be placed, wherein processing electrical contact features to determine a subset of the electrical contact features that could together register with the footprint of the first electrical component comprises processing electrical contact features only within the region to determine a subset of the electrical contact features in the region that could together register with a footprint of the first electrical component.

47. A system for printed circuit board (PCB) component placement comprising: a user interface provided on a display device for receiving one or more electronic PCB design files defining a PCB design; a contact process for processing the one or more electronic PCB design files to determine which PCB design features of the PCB design are electrical contact features; a cluster processor for processing electrical contact features to determine a subset of the electrical contact features that could together register with a footprint of a first electrical component; and a location processor for: determining an X-Y position and an orientation for the footprint that would cause the footprint to register with the subset of the electrical contact features; and generating XYRS data for the first electrical component based on the determined X-Y position and orientation of the footprint.

48. The system of clause 47, comprising: a user interface control for associating an electrical contact feature in the subset of the electrical contact features with a first electrical lead of the first electrical component.

49. The system of clause 48, wherein the determined X-Y position and orientation for the footprint of the first electrical component would also cause the electrical contact feature associated with the first electrical lead of the first electrical component to register with a portion of the footprint that corresponds to the first electrical lead.

50. The system of clause 47, comprising: a region estimator for processing the one or more electronic PCB design files to estimate a region of the PCB design in which the first electrical component is to be placed; wherein the cluster processor for processing electrical contact features to determine a subset of the electrical contact features that could together register with the footprint of the first electrical component processes electrical contact features only within the region to determine a subset of the electrical contact features in the region that could together register with a footprint of the first electrical component.

51. A non-transitory computer readable medium embodying a computer program executable on at least one processor for printed circuit board (PCB) component placement, the computer program comprising: computer program code for receiving one or more electronic PCB design files defining a PCB design; computer program code for processing the one or more electronic PCB design files to determine which PCB design features of the PCB design are electrical contact features; computer program code for processing electrical contact features to determine a subset of the electrical contact features that could together register with a footprint of a first electrical component; computer program code for determining an X-Y position and an orientation for the footprint that would cause the footprint to register with the subset of the electrical contact features; and computer program code for generating XYRS data for the first electrical component based on the determined X-Y position and orientation of the footprint.

52. The non-transitory computer readable medium of clause 51, comprising: computer program code for providing a user interface control for associating an electrical contact feature in the subset of the electrical contact features with a first electrical lead of the first electrical component.

53. The non-transitory computer readable medium of clause 52, wherein the determined X-Y position and orientation for the footprint of the first electrical component would also cause the electrical contact feature associated with the first electrical lead of the first electrical component to register with a portion of the footprint that corresponds to the first electrical lead.

54. The non-transitory computer readable medium of clause 51, comprising: computer program code for processing the one or more electronic PCB design files to estimate a region of the PCB design in which the first electrical component is to be placed; wherein processing electrical contact features to determine a subset of the electrical contact features that could together register with the footprint of the first electrical component comprises processing electrical contact features only within the region to determine a subset of the electrical contact features in the region that could together register with a footprint of the first electrical component.

55. A method for printed circuit board (PCB) component placement comprising: receiving one or more electronic PCB design files defining a PCB design; processing the one or more electronic PCB design files to determine which PCB design features of the PCB design are electrical contact features; for each electrical component of a plurality of electrical components to be assembled with the PCB design: determining whether a footprint of the electrical component positioned and oriented in accordance with first XYRS data for the electrical component would register with electrical contact features of the PCB design; in the event that the footprint of the electrical component positioned and oriented in accordance with first XYRS data for the electrical component would not register with electrical contact features of the PCB design: conducting a corrective procedure to determine an X-Y position and orientation of the footprint that would register with a set of electrical contact features of the PCB design; and generating second XYRS data for the electrical component based at least on the determined X-Y position and orientation of the footprint.

56. The method of clause 55, wherein conducting a corrective procedure to determine an X-Y position and orientation of the footprint that would register with a set of electrical contact features of the PCB design; comprises: graphically displaying, on a display device, at least a portion of the PCB design including a plurality of PCB design features determined to be electrical contact features; providing a user interface control for designating at least one displayed electrical contact feature as an electrical contact for the electrical component.

57. The method of clause 56, comprising: prior to generating the second XYRS data, providing a user interface control for associating one of the displayed electrical contact features with a first electrical lead of the electrical component, wherein the determined X-Y position and orientation for the footprint of the electrical component would also cause the electrical contact feature associated with the first electrical lead of the electrical component to register with a portion of the footprint that corresponds to the first electrical lead.

58. The method of clause 55, wherein conducting a corrective procedure to determine an X-Y position and orientation of the footprint that would register with a set of electrical contact features of the PCB design comprises: processing at least the first XYRS data of the electrical component to estimate a region of the PCB design in which the electrical component is to be placed; processing electrical contact features within the region to determine the set of electrical contact features in the region that could together register with the footprint; and determining an X-Y position and an orientation for the footprint that would cause the footprint to register with the determined set of electrical contact features.

59. A system for printed circuit board (PCB) component placement comprising: a user interface provided on a display device for receiving one or more electronic PCB design files defining a PCB design; a contact process for processing the one or more electronic PCB design files to determine which PCB design features of the PCB design are electrical contact features; a registration process that, for each electrical component of a plurality of electrical components to be assembled with the PCB design: determines whether a footprint of the electrical component positioned and oriented in accordance with first XYRS data for the electrical component would register with electrical contact features of the PCB design; in the event that the footprint of the electrical component positioned and oriented in accordance with first XYRS data for the electrical component would not register with electrical contact features of the PCB design: conducts a corrective procedure to determine an X-Y position and orientation of the footprint that would register with a set of electrical contact features of the PCB design; and generates second XYRS data for the electrical component based at least on the determined X-Y position and orientation of the footprint.

60. The system of clause 59, wherein the registration process conducts the corrective procedure to determine an X-Y position and orientation of the footprint that would register with a set of electrical contact features of the PCB design including: graphically displaying, on a display device, at least a portion of the PCB design including a plurality of the PCB design features determined to be electrical contact features; providing a user interface control for designating at least one displayed electrical contact feature as an electrical contact for the electrical component.

61. The system of clause 60, wherein the registration process: prior to generating the second XYRS data, provides a user interface control for associating one of the displayed electrical contact features with a first electrical lead of the electrical component, wherein the determined X-Y position and orientation for the footprint of the electrical component would also cause the electrical contact feature associated with the first electrical lead of the electrical component to register with a portion of the footprint that corresponds to the first electrical lead.

62. The system of clause 59, wherein the registration process conducts a corrective procedure to determine an X-Y position and orientation of the footprint that would register with a set of electrical contact features of the PCB design including: processing at least the first XYRS data of the electrical component to estimate a region of the PCB design in which the electrical component is to be placed; processing electrical contact features within the region to determine the set of electrical contact features in the region that could together register with the footprint; and determining an X-Y position and an orientation for the footprint that would cause the footprint to register with the determined set of electrical contact features.

63. A non-transitory computer readable medium embodying a computer program executable on at least one processor for printed circuit board (PCB) component placement, the computer program comprising: computer program code for receiving one or more electronic PCB design files defining a PCB design; computer program code for processing the one or more electronic PCB design files to determine which PCB design features of the PCB design are electrical contact features; computer program code for, for each electrical component of a plurality of electrical components to be assembled with the PCB design: determining whether a footprint of the electrical component positioned and oriented in accordance with first XYRS data for the electrical component would register with electrical contact features of the PCB design; in the event that the footprint of the electrical component positioned and oriented in accordance with first XYRS data for the electrical component would not register with electrical contact features of the PCB design: conducting a corrective procedure to determine an X-Y position and orientation of the footprint that would register with a set of electrical contact features of the PCB design; and generating second XYRS data for the electrical component based at least on the determined X-Y position and orientation of the footprint.

64. The non-transitory computer readable medium of clause 63, wherein the computer program code for conducting a corrective procedure to determine an X-Y position and orientation of the footprint that would register with a set of electrical contact features of the PCB design comprises: computer program code for graphically displaying, on a display device, at least a portion of the PCB design including a plurality of the PCB design features determined to be electrical contact features; computer program code for providing a user interface control for designating at least one displayed electrical contact feature as an electrical contact for the electrical component.

65. The non-transitory computer readable medium of clause 64, comprising: computer program code for, prior to generating the second XYRS data, providing a user interface control for associating one of the displayed electrical contact features with a first electrical lead of the electrical component, wherein the determined X-Y position and orientation for the footprint of the electrical component would also cause the electrical contact feature associated with the first electrical lead of the electrical component to register with a portion of the footprint that corresponds to the first electrical lead.

66. The non-transitory computer readable medium of clause 63, wherein the computer program code for conducting a corrective procedure to determine an X-Y position and orientation of the footprint that would register with a set of electrical contact features of the PCB design comprises: computer program code for processing at least the first XYRS data of the electrical component to estimate a region of the PCB design in which the electrical component is to be placed; computer program code for processing electrical contact features within the region to determine the set of electrical contact features in the region that could together register with the footprint; and computer program code for determining an X-Y position and an orientation for the footprint that would cause the footprint to register with the determined set of electrical contact features.

Although embodiments have been described, those of skill in the art will appreciate that variations and modifications may be made without departing from the spirit, scope and purpose of the invention as defined by the appended claims.

What is claimed is:

1. A method for printed circuit board (PCB) component placement comprising:
   graphically displaying, on a display device, PCB design features of a PCB design, the PCB design comprising first XYRS data;
   providing a user interface control for designating one or more of the PCB design features as a respective electrical contact to which a first selected electrical component is to be electrically connected during a PCB assembly;
   automatically generating, based at least on the designating by a user, second XYRS data for at least the first selected electrical component; and
   modifying the PCB design based at least on the second XYRS data.

2. The method of claim 1, comprising:
   receiving the first XYRS data prior to graphically displaying, on the display device, the PCB design features of the PCB design.

3. The method of claim 2, wherein automatically generating the second XYRS data for the first selected electrical component comprises:
   based at least on relationships between X-Y positions of each PCB design feature that is designated as a respective electrical contact for the first selected electrical component with respect to an X axis and a Y axis of the PCB design, defining a placement area for the first selected electrical component; and determining an X-Y position and an orientation for a footprint of the first selected electrical component that would cause the footprint to register with the placement area, wherein the second XYRS data for the first selected electrical component is generated based on the determined X-Y position and orientation of the footprint.

4. The method of claim 3, comprising:
prior to automatically generating the second XYRS data, providing a user interface control for associating a PCB design feature with a first electrical lead of the first selected electrical component.

5. The method of claim 4, comprising:
requiring, in respect of the first selected electrical component, a user to engage with the user interface control for designating prior to permitting the user to engage with the user interface control for associating.

6. The method of claim 5, wherein the user interface control for associating permits associating with the first electrical lead of the first selected electrical component only one of the PCB design features designated, using the user interface control for designating, as electrical contacts for the first selected electrical component.

7. The method of claim 4, wherein the determined X-Y position and orientation for the footprint of the first selected electrical component would also cause the PCB design feature associated with the first electrical lead of the first selected electrical component to register with a portion of the footprint that corresponds to the first electrical lead.

8. The method of claim 2, comprising:
receiving one or more electronic PCB design files defining the PCB design, wherein the one or more electronic PCB design files include the first XYRS data.

9. The method of claim 8, comprising:
prior to graphically displaying, on the display device, the PCB design features of the PCB design, processing at least the first XYRS data to estimate a region of the PCB design in which the first selected electrical component is to be placed, wherein graphically displaying PCB design features of the PCB design comprises zooming in on a subset of the PCB design features of the PCB design that are located in the estimated region.

10. The method of claim 2, comprising:
calculating a first offset between the first XYRS data and the second XYRS data;
providing a user interface control for designating one or more of the PCB design features as a respective electrical contact to which a second selected electrical component is to be electrically connected during the PCB assembly;
receiving third XYRS data for the second selected electrical component prior to graphically displaying, on the display device, the PCB design features of the PCB design;
automatically generating, based at least on the designating, fourth XYRS data for the second selected electrical component;
calculating a second offset between the third XYRS data and the fourth XYRS data; and
responsive to the first offset matching with the second offset:
providing a user interface option to automatically generate additional XYRS data for each of at least one additional component based on the first offset; and
responsive to a user selecting the user interface option to automatically generate the additional XYRS data for each of the at least one additional component based on the first offset, generating the additional XYRS data and modifying the PCB design based at least on the additional XYRS data.

11. The method of claim 1, wherein the modifying comprises:
replacing the first XYRS data for the first selected electrical component with the second XYRS data for the first selected electrical component.

12. A system for printed circuit board (PCB) component placement comprising:
a user interface provided on a display device for graphically displaying PCB design features of a PCB design, the PCB design comprising first XYRS data;
a user interface control for designating one or more of the PCB design features as a respective electrical contact to which a first selected electrical component is to be electrically connected during a PCB assembly; and
one or more processors for:
automatically generating, based at least on the designating by a user, second XYRS data for at least the first selected electrical component; and
modifying the PCB design based at least on the second XYRS data.

13. The system of claim 12, comprising:
a user interface for receiving at least the first XYRS data prior to graphically displaying, on the display device, the PCB design features of the PCB design.

14. The system of claim 13, wherein the modifying comprises replacing the first XYRS data for the first selected electrical component with the second XYRS data for the first selected electrical component.

15. The system of claim 13, wherein the XYRS generator automatically generates the second XYRS data for the first selected electrical component by:
based at least on relationships between X-Y positions of each PCB design feature that is designated as a respective electrical contact for the first selected electrical component with respect to an X axis and a Y axis of the PCB design, defining a placement area for the first selected electrical component; and
determining an X-Y position and an orientation for a footprint of the first selected electrical component that would cause the footprint to register with the placement area,
wherein the second XYRS data for the first selected electrical component is generated based on the determined X-Y position and orientation of the footprint.

16. The system of claim 15, comprising:
a user interface control for associating a PCB design feature with a first electrical lead of the first selected electrical component.

17. The system of claim 16, wherein a user is required, in respect of the first selected electrical component, to engage with the user interface control for designating prior to engaging with the user interface control for associating.

18. The system of claim 17, wherein the user interface control for associating permits associating with the first electrical lead of the first selected electrical component only one of the PCB design features designated, using the user interface control for designating, as electrical contacts for the first selected electrical component.

19. The system of claim 16, wherein the determined X-Y position and orientation for the footprint of the first selected electrical component would also cause the PCB design feature associated with the first electrical lead of the first selected electrical component to register with a portion of the footprint that corresponds to the first electrical lead.

20. The system of claim 13, comprising:
   a user interface for receiving one or more electronic PCB design files defining the PCB design, wherein the one or more electronic PCB design files include the first XYRS data.

21. The system of claim 20, comprising:
   a region estimator for, prior to graphically displaying, on the display device, the PCB design features of the PCB design, processing at least the first XYRS data to estimate a region of the PCB design in which the first selected electrical component is to be placed,
   wherein the user interface for graphically displaying PCB design features of the PCB design zooms in on a subset of the PCB design features of the PCB design that are located in the estimated region.

22. The system of claim 13, comprising:
   a user interface option to automatically generate additional XYRS data for each of at least one additional component based on an offset between the first XYRS data for the first selected electrical component and the second XYRS data for the first selected electrical component.

23. A non-transitory computer readable medium embodying a computer program executable on at least one processor for printed circuit board (PCB) component placement, the computer program comprising:
   computer program code for graphically displaying, on a display device, PCB design features of a PCB design, the PCB design comprising first XYRS data;
   computer program code for providing a user interface control for designating one or more of the PCB design features as a respective electrical contact to which a first selected electrical component is to be electrically connected during a PCB assembly;
   computer program code for automatically generating, based at least on the designating by a user, second XYRS data for at least the first selected electrical component; and
   computer program code for modifying the PCB design based at least on the second XYRS data.

* * * * *